US008078888B2

(12) United States Patent
Kumakura

(10) Patent No.: US 8,078,888 B2
(45) Date of Patent: Dec. 13, 2011

(54) IMAGE FORMING APPARATUS AND ELECTRIC POWER CONSUMPTION CONTROL SYSTEM

(75) Inventor: Shunichi Kumakura, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 713 days.

(21) Appl. No.: 12/180,460

(22) Filed: Jul. 25, 2008

(65) Prior Publication Data

US 2009/0070604 A1 Mar. 12, 2009

(30) Foreign Application Priority Data

Sep. 6, 2007 (JP) ................................ 2007-231011

(51) Int. Cl.
*G06F 1/00* (2006.01)
*G06F 1/26* (2006.01)

(52) U.S. Cl. ....................................... 713/300; 713/320

(58) Field of Classification Search .................... 13/300, 13/320; 713/300, 320
See application file for complete search history.

(56) References Cited

U.S. PATENT DOCUMENTS

| 5,970,224 | A | * | 10/1999 | Salgado et al. | 358/1.16 |
| 6,026,258 | A | * | 2/2000 | Fresk et al. | 399/87 |
| 6,668,305 | B1 | * | 12/2003 | Henriquez | 711/112 |
| 7,370,220 | B1 | * | 5/2008 | Nguyen et al. | 713/330 |
| 7,512,720 | B2 | * | 3/2009 | Schultz et al. | 710/14 |
| 7,581,125 | B2 | * | 8/2009 | Ranganathan et al. | 713/320 |
| 2002/0144162 | A1 | * | 10/2002 | Tada et al. | 713/300 |
| 2003/0079150 | A1 | * | 4/2003 | Smith et al. | 713/320 |
| 2006/0259793 | A1 | * | 11/2006 | Moore et al. | 713/300 |
| 2006/0282689 | A1 | * | 12/2006 | Tipley | 713/300 |
| 2009/0089595 | A1 | * | 4/2009 | Brey et al. | 713/300 |

FOREIGN PATENT DOCUMENTS

| JP | 05-072844 | 3/1993 |
| JP | 2002-297353 | 10/2002 |
| JP | 2002297353 A | * 10/2002 |

* cited by examiner

*Primary Examiner* — Mark Connolly
(74) *Attorney, Agent, or Firm* — Squire, Sanders & Dempsey (US) LLP

(57) ABSTRACT

There is described an image forming apparatus that appropriately selects a specific image forming apparatus to be shifted to the power saving mode, to avoid the power shutdown of the system. The apparatus includes; an electric power consumption notifying section to notify other image forming apparatuses of its own electric power consumption; a priority degree determining section to determine an implementation priority degree of a job; a job implementation electric-power calculating section to calculate an estimated value of the own electric power consumption when the image forming apparatus implements an implementation scheduled job; and an arbitration controlling section to transmit an instruction for reducing electric power consumption to the specific image forming apparatus that currently implements a job whose implementation priority degree is lower than that of the implementation scheduled job, when the total electric power consumption exceeds the upper limit electric power consumption established in advance.

18 Claims, 17 Drawing Sheets

| CONTROLLED TERMINAL ID | CURRENT ELECTRIC POWER CONSUMPTION (W) | REQUESTER INFORMATION | REQUESTEE INFORMATION |
|---|---|---|---|
| MULTI-FUNCTIONAL PERIPHERAL (1) | 1000 | RR | - |
| MULTI-FUNCTIONAL PERIPHERAL (2) | 10 | - | - |
| MULTI-FUNCTIONAL PERIPHERAL (3) | 200 | - | - |
| MULTI-FUNCTIONAL PERIPHERAL (4) | 10 | - | RE |
| MULTI-FUNCTIONAL PERIPHERAL (5) | 10 | - | RE |
| MULTI-FUNCTIONAL PERIPHERAL (6) | 0 | - | - |

FIG. 6 (a)

| MANAGERIAL POSITION | COEFFICIENT |
|---|---|
| REGULAR PERSONNEL | 1 |
| MANAGER | 0.7 |
| HIGHER THAN DIRECTOR | 0.4 |

FIG. 6 (b)

| PROCESSING CAPABILITY | COEFFICIENT |
|---|---|
| LOW SPEED APPARATUS | 1 |
| MEDIUM SPEED APPARATUS | 0.7 |
| HIGH SPEED APPARATUS | 0.4 |

FIG. 6 (c)

| STATE OF APPARATUS | COEFFICIENT |
|---|---|
| NORMAL STANDBY STATE | 1 |
| POWER SAVING STANDBY STATE | 0.5 |

FIG. 18

| CONTROL DATA / ID OF CONTROLLED TERMINAL DEVICE | STATUS OF CONTROLLED TERMINAL DEVICE | | | | |
|---|---|---|---|---|---|
| | OPERATING STATUS | POWER-SAVING MODE REQUEST RELATIONSHIP | | CURRENT ELECTRIC POWER CONSUMPTION (W) | JOB IMPLEMENTATION PRIORITY DEGREE |
| | | REQUESTEE | REQUESTER | | |
| MULTI-FUNCTIONAL PERIPHERAL (1) | OPERATING | MULTI-FUNCTIONAL PERIPHERAL (2) | - | 1000 | 1 |
| MULTI-FUNCTIONAL PERIPHERAL (2) | SLEEP | MULTI-FUNCTIONAL PERIPHERAL (4), (5) | MULTI-FUNCTIONAL PERIPHERAL (1) | 10 | 2 |
| MULTI-FUNCTIONAL PERIPHERAL (3) | OPERATING | - | - | 200 | 3 |
| MULTI-FUNCTIONAL PERIPHERAL (4) | SLEEP | - | MULTI-FUNCTIONAL PERIPHERAL (2) | 10 | 4 |
| MULTI-FUNCTIONAL PERIPHERAL (5) | SLEEP | - | MULTI-FUNCTIONAL PERIPHERAL (2) | 10 | 5 |
| MULTI-FUNCTIONAL PERIPHERAL (6) | OFF | - | - | 0 | - |

IMAGE FORMING APPARATUS AND ELECTRIC POWER CONSUMPTION CONTROL SYSTEM

This application is based on Japanese Patent Application NO. 2007-231011 filed on Sep. 6, 2007, with Japan Patent Office, the entire content of which is hereby incorporated by reference.

BACKGROUND OF THE INVENTION

The present invention relates to an electric power consumption control system in which a total electric power consumption to be consumed by a plurality of image forming apparatuses installed in the system is controlled, so as to prevent the system from occurring an interruption of an electric power supply (hereinafter, referred to as a power shutdown, for simplicity) caused by an excessive consumption of the total electric power supplied to the plurality of image forming apparatuses.

An abrupt power shutdown tends to cause harmful influences for an apparatus concerned. Accordingly, for instance, it is necessary for an image forming apparatus, such as a digital Multi-Functional Peripheral or the like, to protect an HDD (Hard Disc Drive) for storing digital image data from a failure and/or a damage caused by the abrupt power shutdown. Further, sometimes, a jam occurrence, caused by the abrupt power shutdown during a printing operation, not only requires a cumbersome operation for removing a jammed paper sheet, but also makes a torn part of the jammed paper sheet remain in the apparatus during the removing process, or makes the apparatus inside and/or the hands of the operator contaminated by the unfixed toner image.

To overcome the abovementioned inconveniences, for instance, Tokkaihei 5-72844 (Japanese Non-Examined Patent Publication) sets forth such an apparatus that incorporates a UPS (Uninterruptible Power Supply) and reduces the electric power consumption at a minimum level when the apparatus is operated in a UPS mode (by using electric power supplied from the UPS) after an occurrence of an unexpected power shutdown so as to extend a time duration for supplying the electric power from the UPS, so that, during the abovementioned time duration, the apparatus can perform various protective operations, such as notifying the user of the occurrence of the power shutdown, ejecting a recording paper sheet in mid-course of copy processing so as not to remain it inside the apparatus, initializing a photoreceptor member so as to protect the photoreceptor member from harmful influences, storing various kinds of information into a nonvolatile memory serving as a temporal shelter so as to make it possible to resume the processing of the current job at the time of resumption of the apparatus operations after the electric power supply is restored to the normal state, and conducting shutdown operations so as to stop the electric power supply from the UPS after the abovementioned operations are completed.

Further, for instance, Tokkai 2002-297353 (Japanese Non-Examined Patent Publication) sets forth such a system that includes a plurality of image forming apparatuses, which are coupled to each other through a network in such a manner that the plurality of image forming apparatuses are controlled by bilaterally communicating with each other, so that the total electric power consumption does not exceed a predetermined threshold level, in order to prevents the plurality of image forming apparatuses from the power shutdown. Concretely speaking, when a certain image forming apparatus included in the system accepts a job instructed by a user, with the implementation priority of the job concerned. At this occasion, when the image forming apparatus concerned determines that the total electric power consumption to be consumed by all of the image forming apparatuses included in the system will exceed the predetermined threshold level if the job instructed by the user concerned is implemented, the image forming apparatus concerned instructs another image forming apparatus, which is currently performing another job having an implementation priority lower than that instructed by the user concerned, to implement the other job in a power saving mode. Receiving the abovementioned instruction from the image forming apparatus concerned, the other image forming apparatus implements the other job in a low speed mode, so as to reduce the total electric power consumption to be consumed in the system.

Although the UPS makes it possible to appropriately cope with an abrupt power shutdown as abovementioned, the UPS is very expensive. Specifically in the image forming apparatus that employs a fixing device for applying heat and pressure onto a toner image so as to fix the toner image onto the transfer material, it is necessary to employ such a UPS that has a bulk power outputting capability, due to the large amount of electric power consumed by the fixing device, and accordingly, the price of the image forming apparatus would be skyrocketed.

On the other hand, in the abovementioned system in which priorities of various jobs are compared with each other based on the implementation priority designated by the user so as to implement the low priority job in a low speed mode, since every user can freely establish the implementation priority degree of his own job at any rank, the user tends to designate it at a "high" priority rank. As a result, since most of all jobs are set to the "high" priority rank, there has arisen a problem that the arbitrating operation based on the implementation priorities designated by various users could not be achieved successfully.

Therefore, it is required to provide an image forming apparatus and an electric power consumption control system, which makes it possible to appropriately select a specific image forming apparatus to be shifted to the power saving mode, based on the implementation priority degree, in order to avoid the power shutdown of the electric power consumption control system.

SUMMARY OF THE INVENTION

The aspects of the present invention are any one of the image forming apparatuses and the electric power consumption control systems as described follows.

(1) According to an image forming apparatus reflecting an aspect of the present invention, the image forming apparatus that is included in a plurality of image forming apparatuses, which are coupled to each other through a communication network in such a manner that the plurality of image forming apparatuses can bilaterally communicate with each other, the image forming apparatus comprises: an electric power consumption notifying section that calculates an own electric power consumption, representing an amount of electric power to be consumed by the image forming apparatus itself, so as to notify other image forming apparatuses of the own electric power consumption; a priority degree determining section to determine an implementation priority degree of a job, based on a kind of the job; a job implementation electric-power calculating section to calculate an estimated value of the own electric power consumption in regard to electric power to be consumed when the image forming apparatus implements an implementation scheduled job; and an arbitration controlling section that calculates a total electric power consumption to be consumed by the plurality of image forming apparatuses when the image forming apparatus implements the implementation scheduled job, based on electric power consumptions notified by the other image forming apparatuses and the estimated value of the own electric power consumption, so as to transmit an instruction for reducing electric power consumption to a specific image forming apparatus (or each of specific image forming apparatuses) that currently implements a job whose implementation priority degree is lower than that of the implementation scheduled job, when the total electric power consumption calculated in the above exceeds an upper limit electric power consumption established in advance.

(2) According to an electric power consumption control system reflecting yet another aspect of the present invention, the electric power consumption control system comprises: a communication network; and a plurality of image forming apparatuses, which are coupled to each other through the communication network in such a manner that the plurality of image forming apparatuses can bilaterally communicate with each other; wherein each of the plurality of image forming apparatuses is such the image forming apparatus that is recited in item 1.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6(a), FIG. 6(b) and FIG. 6(c) are explanatory drawings showing examples of coefficient tables;

FIG. 18 is an explanatory drawing showing an example of a terminal device controlling common table.

DETAILED DESCRIPTION OF THE PREFERRED EMBODIMENT

Figure 1:
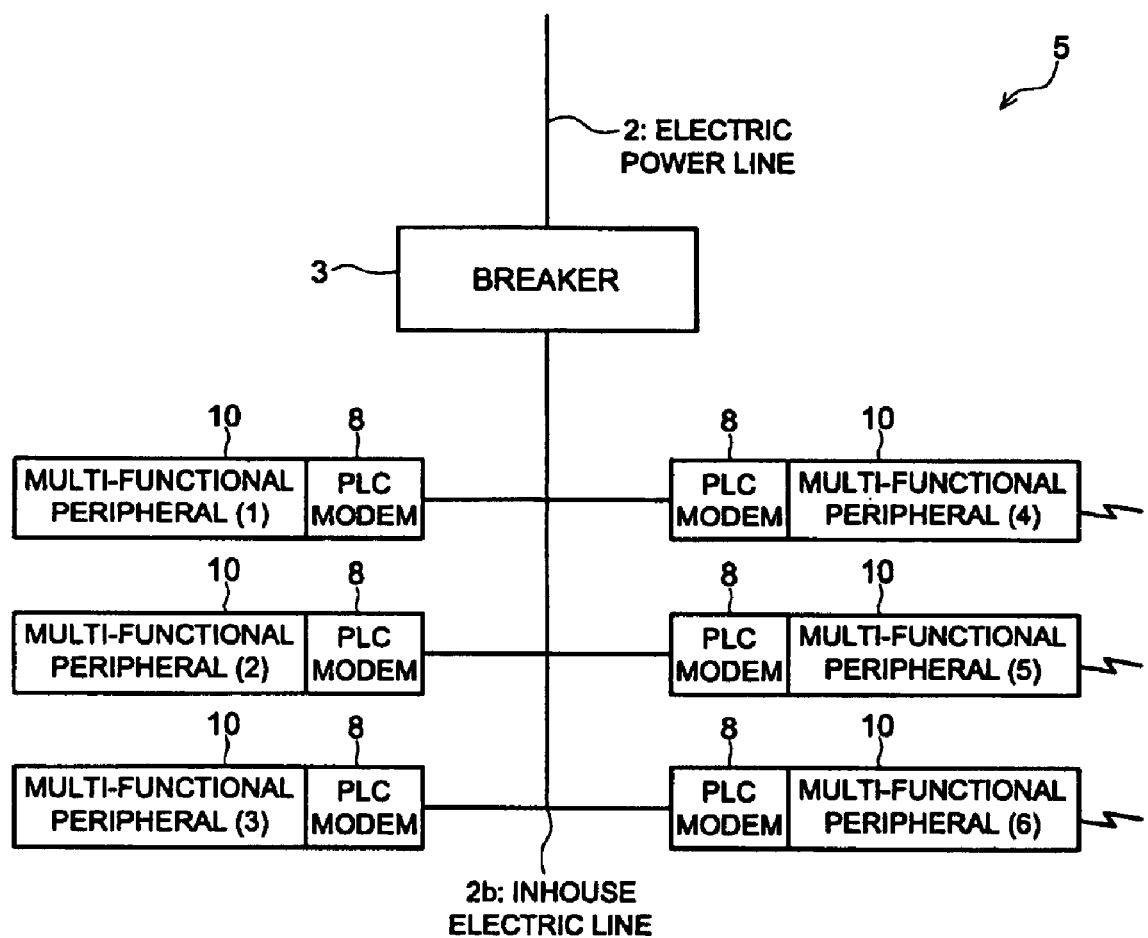
FIG. 1 shows an example of a system configuration of an electric power consumption control system embodied in the present invention.

Referring to the drawings, the preferred embodiment of the present invention will be detailed in the following.

FIG. 1 shows an example of a system configuration of an electric power consumption control system embodied in the present invention. The electric power consumption control system 5 is constituted by a plurality of Multi-Functional Peripherals 10 (hereinafter, each of Multi-Functional Peripherals 10 is referred to as Multi-Functional Peripheral 10, for simplicity), which are coupled to an electric line (inhouse electric line 2b) extended downstream (distributing direction) from a breaker 3 that is inserted into an electric power line 2 coming from outside.

The Multi-Functional Peripheral 10 is provided with a PLC (Power Line Communication) modem 8 that employs the inhouse electric line 2b as a communication line to conducts communicating operations, so as to make it possible to bilaterally communicate various kinds of information with the other Multi-Functional Peripherals 10 through the inhouse electric line 2b.

The Multi-Functional Peripheral 10 is so constituted that the Multi-Functional Peripheral 10 notifies the other Multi-Functional Peripherals 10 of its own electric power consumption each other, so that the Multi-Functional Peripheral 10 is capable of always recognizing each of electric power consumption amounts of the other Multi-Functional Peripherals 10 residing within the electric power consumption control system 5 and a total electric power consumption to be consumed in the electric power consumption control system 5.

Before implementing a new job, the Multi-Functional Peripheral 10 determines whether or not the total electric power consumption to be consumed by all of the Multi-Functional Peripherals 10 included in the system will exceed an upper limit of the electric power consumption (predetermined threshold level) if the new job is implemented. When determining that the total electric power consumption will exceed the upper limit, the Multi-Functional Peripheral 10 concerned instructs another Multi-Functional Peripheral 10, which is currently performing another job having an implementation priority lower than that of the new job to be implemented by the Multi-Functional Peripherals 10 concerned, so as to shift the current operating mode to a power-saving mode (in other words, makes the other Multi-Functional Peripheral 10 reduce its electric power consumption), and then, actually implements the new job reserved in advance. In this connection, in the electric power consumption control system 5 embodied in the present invention, the implementation priority of every job cannot be arbitrarily established by the user, but is determined in accordance with various kinds of standardized factors established in advance. One of the standardized factors would be a kind of job. Other than the kind of job, other arbitral factors, such as factors in regard to attributes of the user (including an authority level, an official post and rank, etc.), a processing capability and statuses of the Multi-Functional Peripheral 10, etc., may be added to the standardized factors.

Figure 2:
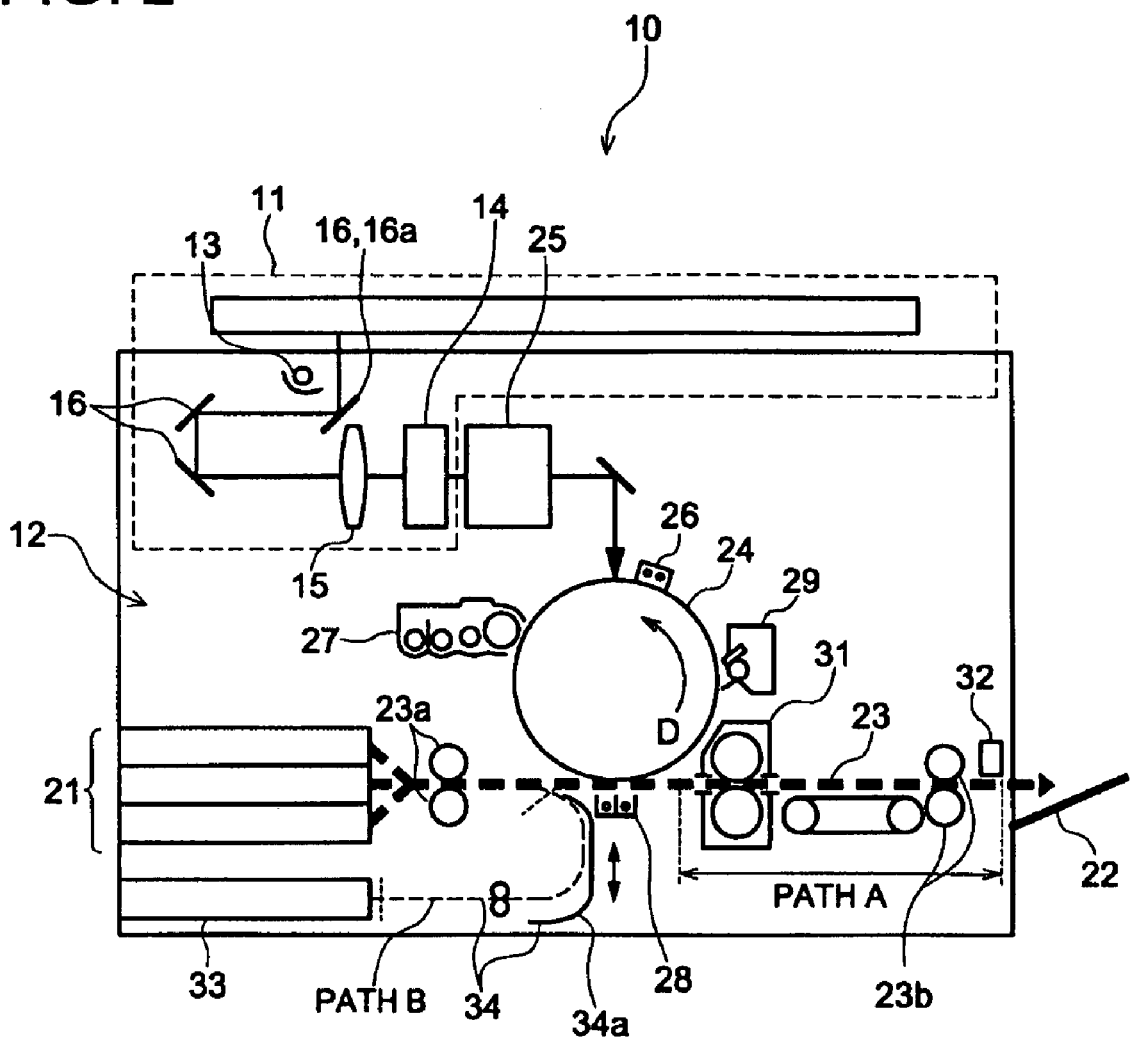
FIG. 2 shows a rough block diagram of an internal mechanical configuration of a Multi-Functional Peripheral embodied in the present invention.

FIG. 2 shows a rough block diagram of an internal mechanical configuration of the Multi-Functional Peripheral 10. The Multi-Functional Peripheral 10 is such an image forming apparatus that is provided with: a copy function for optically reading an original image of a document so as to print an image reproduced from the original image onto a recording paper sheet; a scanning function for storing digital image data read from the original image of the document into a file and/or transmitting the digital image data to an external terminal device; a printing function for rasterizing print data received from the external terminal device so as to print a reproduced image represented by the rasterized print data onto the recording paper sheet to be outputted; a facsimile function for transmitting and receiving image data; etc.

The Multi-Functional Peripheral 10 is provided with a reading section 11 to optically read an original image of a document so as to acquire digital image data and a recording section 12 to form an image based on the digital image data onto a recording paper sheet and to output the recording paper sheet on which the reproduced image is formed. The reading section 11 is constituted by: a light source 13 to irradiate a light beam onto the document; a line image sensor 14 to receive the light beam reflected from the document so as to read the document in a width direction of the document by one scanning line; an optical system that includes various kinds of optical components, such as a lens 15, a mirror 16, etc., to guide and focus the light beam reflected from the document onto the line image sensor 14; a moving mechanism (not shown in the drawings) to drive a mirror 16a and/or the light source 13 so as to incrementally move the reading position in a unit of the scanning line toward a longitudinal direction of the document; etc.

The recording section 12 forms the reproduced image on the recording paper sheet according to the electro-photographic process. The recording section 12 is provided with a paper sheet feeding tray 21, in which a large number of paper sheets are accommodated, and a conveyance path 23 through which the paper sheet, picked up from the paper sheet feeding tray 21, is conveyed toward a paper sheet ejecting tray 22. The conveyance path 23 is constituted by various kinds of conveyance rollers (such as a paper sheet feeding roller 23a, a paper sheet ejecting roller 23b, etc.).

Further, the recording section 12 is provided with: a photoreceptor drum 24 that is disposed at a position so as to closely face to the recording paper sheet currently conveyed on the conveyance path 23 and rotates in a direction indicated by an arrow D shown in FIG. 2; an image processing and laser beam modulating section 25 to irradiate a laser beam modulated by the processed image data onto the photoreceptor drum 24; a charging device 26, a developing device 27, a transferring separation device 28 and a cleaning device 29 that are disposed in a peripheral space around a circumferential surface of the photoreceptor drum 24; a fixing device 31 that is disposed at a downstream side of the photoreceptor drum 24 in a mid-course of the conveyance path 23, and through which the recording paper sheet, currently conveyed, passes; etc.

Still further, the recording section 12 is further provided with a stamping section 32 that is disposed at downstream side of the fixing device 31 so as to stamp a predetermined seal onto the recording paper sheet to be ejected toward the paper sheet ejecting tray 22, and a recovery conveyance mechanism 34 to make the recording paper sheet withdraw from the conveyance path 23 immediately in front of the photoreceptor drum 24 so as to convey it to a non-recorded paper sheet ejecting tray 33. The recovery conveyance mechanism 34 is provided with a guide plate 34a that is bended in a U-character shape turning sideway so as to change the conveyance direction of the recording paper sheet. The guide plate 34a is driven to move in an upper-to-lower direction by controlling actions of a driving section (not shown in the drawings). Although the guide plate 34a is set at a lower position in the normal operating mode, at the time when recovering the recording paper sheet into the non-recorded paper sheet ejecting tray 33, the upper edge portion of the guide plate 34a is advanced into a mid-course of the conveyance path 23 so as to receive the leading edge of the recording paper sheet and guide the recording paper sheet toward the non-recorded paper sheet ejecting tray 33 by reversing its conveyance path.

After the circumferential surface of the photoreceptor drum 24 is uniformly charged by the corona discharging action of the charging device 26, an electrostatic latent image is formed on the circumferential surface of the photoreceptor drum 24 by irradiating the laser beam emitted from the image processing and laser beam modulating section 25 onto it. The electrostatic latent image is developed to a toner image by the developing device 27, and then, the toner image concerned is transferred onto the recording paper sheet, currently conveyed, at a position where the transferring separation device 28 and the photoreceptor drum 24 oppose to each other. After the transferring operation is completed, the cleaning device 29 removes the residual toners, which have remained on the circumferential surface of the photoreceptor drum 24. On the other hand, when the recording paper sheet having the transferred toner image passes through the fixing device 31, heat and pressure are applied to both the toner image and the recording paper sheet, so as to fix the toner image onto the recording paper sheet.

Figure 3:
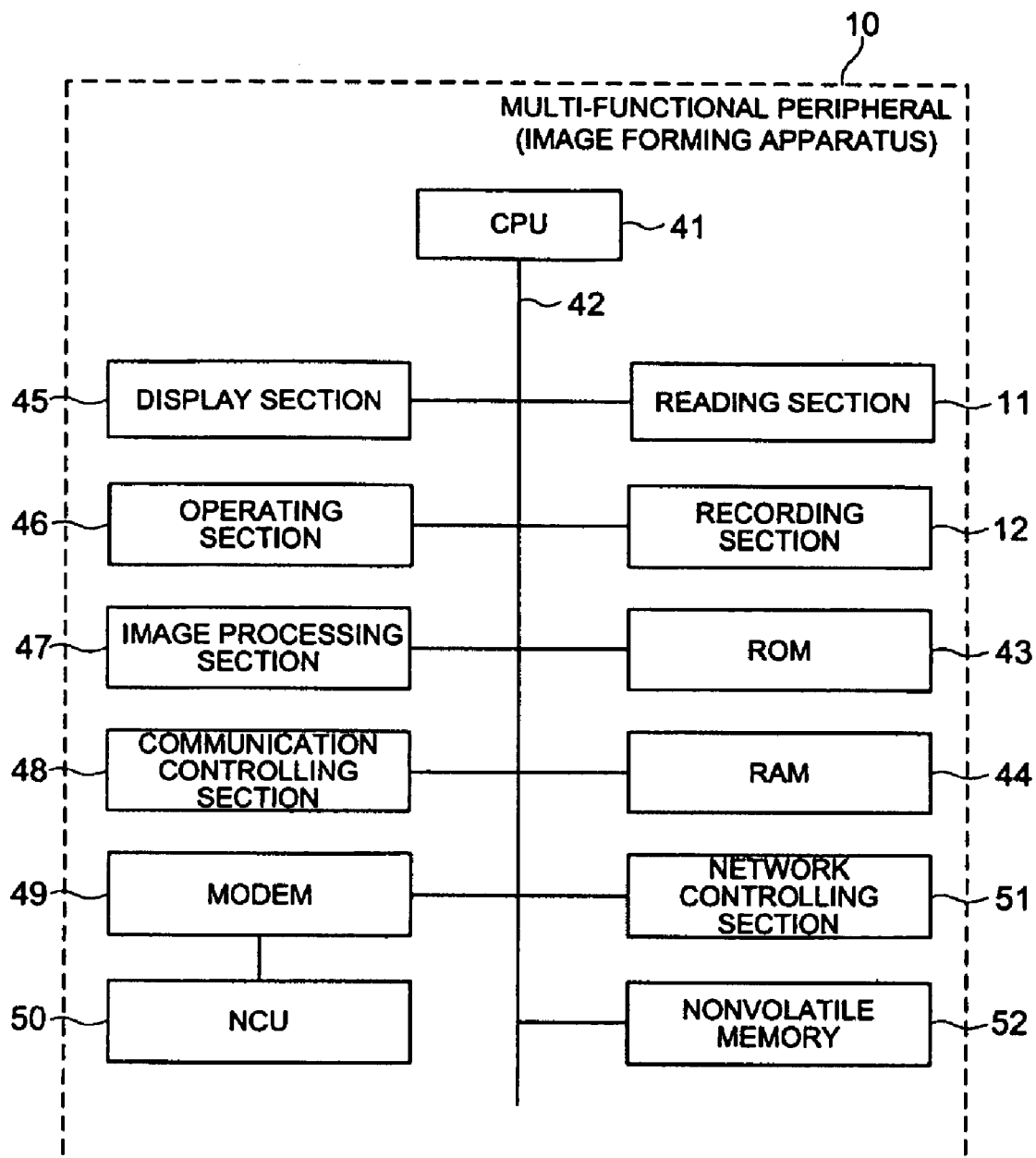
FIG. 3 shows a block diagram of a brief electric configuration of a Multi-Functional Peripheral embodied in the present invention.

FIG. 3 shows a block diagram of a brief electric configuration of the Multi-Functional Peripheral 10. The Multi-Functional Peripherals 10 is constituted by: a CPU (Central Processing Unit) 41 to control the operations of the Multi-Functional Peripherals 10 concerned; the reading section 11; the recording section 12; a ROM (Read Only Memory) 43; a RAM (Random Access Memory) 44; a display section 45; an operating section 46; an image processing section 47; a communication controlling section 48; a modem 49; a network controlling section 51; a nonvolatile memory 52; a bus 42 through which the abovementioned sections and memories are coupled to the CPU 41; etc. Further, a NCU (Network Control Unit) 50 is coupled to the modem 49 as a slave device of the modem 49.

The ROM 43 stores various kinds of programs and fixed data therein, and the CPU 41 implements various kinds of processing by executing the programs stored in the ROM 43. The RAM 44 serves as a working memory and/or an image memory to temporarily store various kinds of data to be used when the CPU 41 executes the programs therein. Further, the RAM 44 also stores a terminal device control table 60 (shown in FIG. 4) detailed later, therein. The nonvolatile memory 52 stores information, such as a password for authenticating the user or the manager, etc., therein.

The display section 45 is constituted by a LCD (Liquid Crystal Display) to display various kinds of operating screens, setting screens, guiding screens, etc., to be used by the user, thereon, etc. The operating section 46 is constituted by various kinds of operational switches, such as a touch panel that is mounted on the surface of the LCD so as to detect coordinate values of a depressed position, a ten key, a start button, etc., in order to receive various kinds of operations conducted by the user.

The image processing section 47 is such an electronic circuit that applies various kinds of image processing, such as an expansion processing, a reduction processing, a cell averaging processing, a resolution conversion processing, a γ conversion processing, a screen processing, etc., to the digital image data. The communication controlling section 48 performs a protocol controlling operation in regard to the facsimile transmission. The modem 49 performs a modulating operation to make it possible to transmit digital signals by modulating analogue signals with the digital signals concerned and a demodulating operation to demodulate the digital signals from the modulated analogue signals, while the NCU 50 is coupled to the public telephone network so as to conduct controlling and detecting operations with respect to calling actions and called actions.

The network controlling section 51 conducts operations for communicating with the external apparatuses by bilaterally transmitting and receiving various kinds of data through a LAN (Local Area Network). Further, the network controlling section 51 also serves as the PLC modem 8, and therefore, also conducts operations for communicating with the other Multi-Functional Peripherals 10 through the inhouse electric line 2b.

The CPU 41 serves as each of various kinds of operational sections, such as an electric power consumption notifying section, an individual-terminal electric power consumption controlling section, a power source controlling section, a job implementation power calculating section, a priority degree determining section, an arbitration controlling section, etc., by executing corresponding one of the programs.

The power source controlling section conducts such a controlling operation for shifting (changing or altering) an operating mode of its own apparatus between a normal mode and a low electric power consumption mode (such as a power saving mode, a sleep mode, etc.) in which the power consumption of the apparatus concerned is smaller than that in the normal mode.

The electric power consumption notifying section calculates an electric power consumption of its own apparatus so as to notify the other Multi-Functional Peripherals 10 of the calculated electric power consumption of its own. Although it is applicable that the actual electric power currently consumed in the Multi-Functional Peripheral 10 concerned is found by employing an electric power meter, etc., the present embodiment is so constituted that the electric power consumption notifying section calculates an electric power consumption in future immediate after the current time point (for instance, at one second future from the current time point).

In other words, since the CPU 41 controls and manages all aspects of the job to be implemented in the Multi-Functional Peripheral 10 concerned, the CPU 41 recognizes in advance how the implementation status of the job will change at a next step, before the implementation status of the job has actually changed. For instance, the CPU 41 recognizes in advance a fact that the reading section 11 enters into an activated status immediately after the operation for setting the copy function is completed and the start button is depressed, and another fact that the recording section 12 commences the printing operation immediately after all of the necessary image data to be outputted are prepared. Accordingly, it becomes possible for the CPU 41 to calculate the electric power consumption corresponding to the implementation status of the job in future immediate after the current time point (for instance, at one second future from the current time point). Concretely speaking, the CPU 41 measures or calculates in advance the electric power consumption for every one of various kinds of implementation statuses so as to create and store a table, which indicates the electric power consumption for every implementation status. Referring to the table abovementioned, the CPU 41 calculates the electric power consumption corresponding to the implementation status of the concerned job in near future.

The electric power consumption notifying section periodically notifies the other Multi-Functional Peripherals 10 of the calculated electric power consumption, for instance, for every time interval of one or several seconds, and further, even in the power saving mode. In this connection, it is applicable that the calculated electric power consumption is notified only at the time immediately before the implementation status of the concerned job changes. Further, it is also applicable that the notifying time interval is extended during the power saving mode, or the calculated electric power consumption is notified only at the time when entering into the power saving mode.

Based on the electric power consumption of its own apparatus, calculated by the electric power consumption notifying section, and the electric power consumptions of the other Multi-Functional Peripherals 10, notified by the other electric power consumption notifying sections, the individual-terminal electric power consumption controlling section always recognizes each of the electric power consumptions of the Multi-Functional Peripherals 10 residing within the electric power consumption control system 5 and a total amount of electric power to be consumed by all of the Multi-Functional Peripherals 10 in the electric power consumption control system 5 (hereinafter, referred to as a total electric power consumption). The total electric power consumption is calculated by totally summing the electric power consumptions of the Multi-Functional Peripherals 10.

Figure 4:
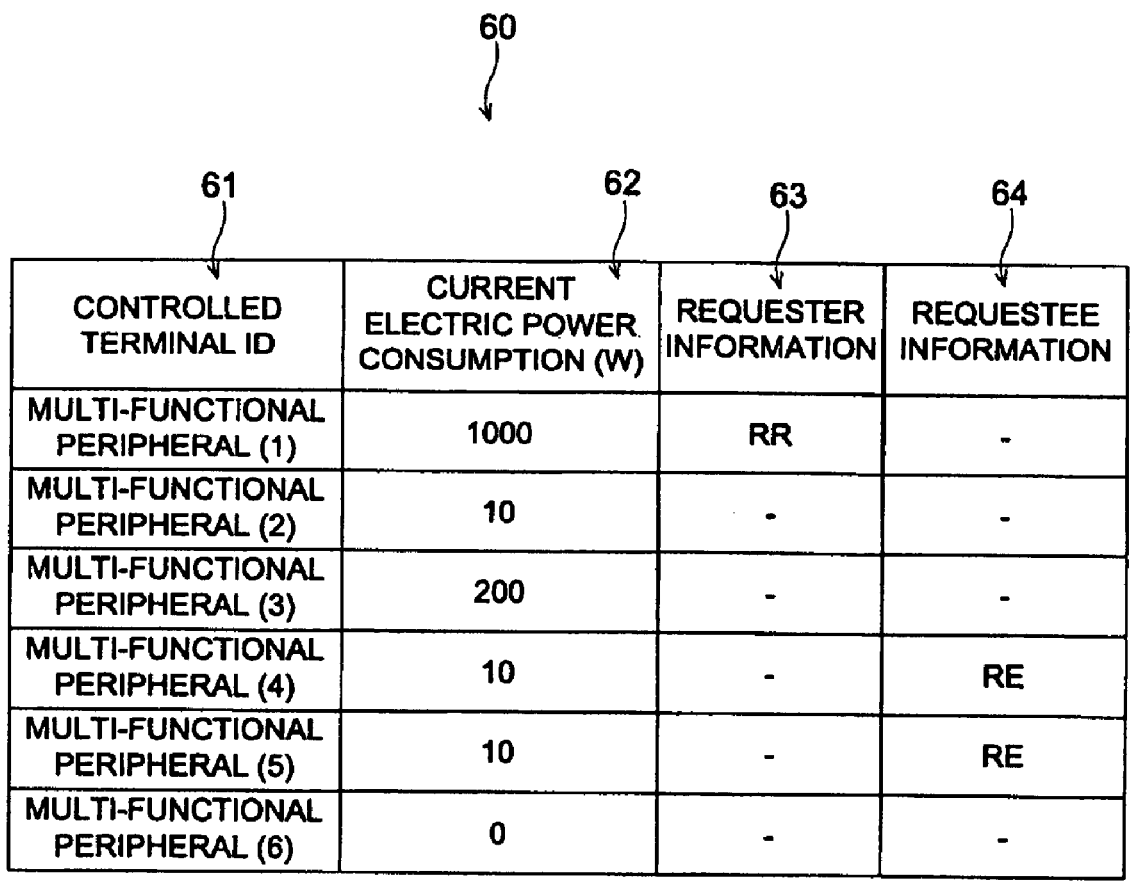
FIG. 4 is an explanatory drawing showing an example of a terminal control table.

FIG. 4 shows an example of a terminal control table 60 to be controlled by the individual-terminal electric power consumption controlling section. As shown in FIG. 4, all of the Multi-Functional Peripherals 10 residing in the electric power consumption control system 5 are registered in the terminal control table 60 (herein, six sets of Multi-Functional Peripherals 10 (Multi-Functional Peripheral (1) through Multi-Functional Peripheral (6)) are registered). With respect to each of the Multi-Functional Peripherals 10, a controlled terminal ID 61, serving as information for identifying the Multi-Functional Peripheral 10, and a current electric power consumption 62 of the Multi-Functional Peripheral 10 concerned, are indicated. The symbol "*" indicates its own apparatus that controls this terminal control table 60.

Further, a requester information 63 (represented by the symbol "RR" shown in FIG. 4) is defined as such information that indicates another Multi-Functional Peripheral 10 serving as a requester, which originally transmits a power-saving mode shift signal to the Multi-Functional Peripheral 10 concerned (own apparatus), when the Multi-Functional Peripheral 10 concerned currently enters into the power saving mode based on the power-saving mode shift signal received from the other Multi-Functional Peripheral 10 as the instruction for reducing the electric power (in other words, the instruction for shifting its current operating mode to the power saving mode). On the other hand, a requestee information 64 (represented by the symbol "RE" shown in FIG. 4) is defined as such information that indicates another Multi-Functional Peripheral 10 serving as a requestee, which currently enters into the power saving mode based on the power-saving mode shift signal, when the Multi-Functional Peripheral 10 concerned (own apparatus) originally transmits the power-saving mode shift signal to the other Multi-Functional Peripheral 10 so as to make the other Multi-Functional Peripheral 10 shift its current operating mode to the power saving mode.

According to the example shown in FIG. 4, the Multi-Functional Peripheral 10 concerned (own apparatus) is the Multi-Functional Peripheral (2). Accordingly, in order to implement its own job, the Multi-Functional Peripheral (2) transmits the power-saving mode shift signal to both the Multi-Functional Peripheral (4) and the Multi-Functional Peripheral (5), so as to make them shift to the power saving mode. Further, after that, receiving the power-saving mode shift signal sent from the Multi-Functional Peripheral (1), the Multi-Functional Peripheral (2) shifts its current operating mode to the power saving mode.

The job implementation power calculating section calculates an estimated value of electric power consumption of its own apparatus, if an implementation-scheduled job is implemented as scheduled. As well as the electric power consumption notifying section, by employing the method for referring to the table in which the electric power consumption is registered for every one of various implementation statuses of the job, namely, by referring to the table in the job implementation status when the implementation-scheduled job is implemented, the job implementation power calculating section calculates the estimated value of electric power consumption when the implementation-scheduled job is implemented as scheduled (hereinafter, referred to as the scheduled electric power consumption).

Before actually implementing the implementation-scheduled job, the arbitration controlling section determines whether or not the total electric power consumption (estimated value of the total electric power consumption) in the electric power consumption control system 5 exceeds the upper limit value of electric power consumption (threshold value) established in advance when the implementation-scheduled job is actually implemented. When determining that it exceeds the upper limit value, the arbitration controlling section conducts such a controlling operation for making another Multi-Functional Peripheral 10, which is currently implementing a certain job whose implementation priority is lower than that of the implementation-scheduled job, shift its current operating mode to the power saving mode, and/or another controlling operation for making still another Multi-Functional Peripheral 10, which is currently made to enter into the power saving mode, resume an original operating mode. The estimated value of the total electric power consumption is calculated by totally summing the electric power consumptions notified from the other Multi-Functional Peripherals 10 and the scheduled electric power consumption calculated by the job implementation power calculating section.

The priority degree determining section for determining implementation priority degrees of jobs determines an implementation priority degree of a specific job, based on a kind of job, etc. For instance, various kinds of print jobs include 1) top-secret printing, 2) Web printing, 3) photographic printing, 4) color printing, 5) duplex printing, 6) monochrome printing, etc., and a fundamental priority degree is established for every kind of print job. In this connection, each of the abovementioned numerals 1)-6) indicates an initial value of the fundamental priority degree corresponding to each kind of abovementioned print jobs. The initial values are determined according to the reasons described in the following.

1) TOP-SECRET PRINTING: The top-secret printing is such a print job that is to be implemented under the condition that an outputting right in regard to outputting operations of a certain print job requested by an external terminal device is authenticated by a password, etc., inputted from the operating section 46. Since a high concealing attribute is attached to this kind of print job, the suspension of the processing in mid-course of its printing operations should be avoided at the first priority. Therefore, the initial value of its implementation priority is set at "1" as the highest rank.

2) Web PRINTING: The Web printing is such a print job that is to be implemented by the Multi-Functional Peripheral 10, based on such data that is acquired by polling the data stored in the external terminal device through the Internet. In the Web environment, if access time out or the like happens to interrupt the polling operation or the downloading operation currently conducted by the Multi-Functional Peripheral 10, it is liable to become very cumbersome to resume the concerned operation from its mid-course at the interrupted time point. Accordingly, since the Web printing is one of the jobs that are desired not to be interrupted or suspended, the initial value of its implementation priority is set at "2" as the second rank.

3) PHOTOGRAPHIC PRINTING, 4) COLOR PRINTING: If the operation for creating a photographic print or a color print is suspended in mid-course of its processing, the color appearance of the photographic print or the color print would possibly change between before and after its processing is resumed. Accordingly, both the photographic printing and the color printing are such print jobs that are desired not to be suspended if possible. Therefore, the initial value of its implementation priority is set at "3" or "4" as the middle class rank.

5) DUPLEX PRINTING: The duplex printing is such a print job that prints images onto both sides of the recording paper sheet. If the duplex printing operation is suspended in such a state that the printing operation for only one side is finished, the possibility of jam occurrence at the time of resuming the printing operation for the other side increases. Accordingly, the duplex printing is a print job that is desired not to be suspended as far as possible. Therefore, the initial value of its implementation priority is set at "5" as the lower rank.

6) MONOCHROME PRINTING: The monochrome printing is such a print job that prints a monochrome image onto one side of the recording paper sheet. No problem would occur even if the monochrome printing operation is suspended in mid-course of its processing. Therefore, the initial value of its implementation priority is set at "6" as the further lower rank.

Further, other than the abovementioned jobs, the Multi-Functional Peripheral 10 handles a part of the initial operations, to be performed after the main power source is turned ON, as a warm-up job. The implementation priority of the warm-up job is set at the lowest rank (in the present embodiment, set at "7"). Among the initial operations to be performed after the main power source is turned ON, the operations for initializing the network controlling section 51 and the RAM 44, and the operations to be conducted until the bilateral notification of the electric power consumption with the other Multi-Functional Peripherals 10, and the arbitration control based on the implementation priorities of various jobs, are available, are non-job operations and are implemented immediately after the main power source is turned ON. The warm-up job is such an initial operation that is implemented after the abovementioned non-job operations are completed, and includes one or more arbitral operation(s), each of which consumes a large amount of electric power among the initial operations. For instance, the operation for heating up the fixing device 31 up to a predetermined temperature is included in the warm-up job. Other than the above, it is applicable that any kind of arbitral operation, such as the operation for discharging and/or cleaning the photoreceptor drum 24, the operation for initializing the developing device 27, etc., is included in the warm-up job.

Figure 5:
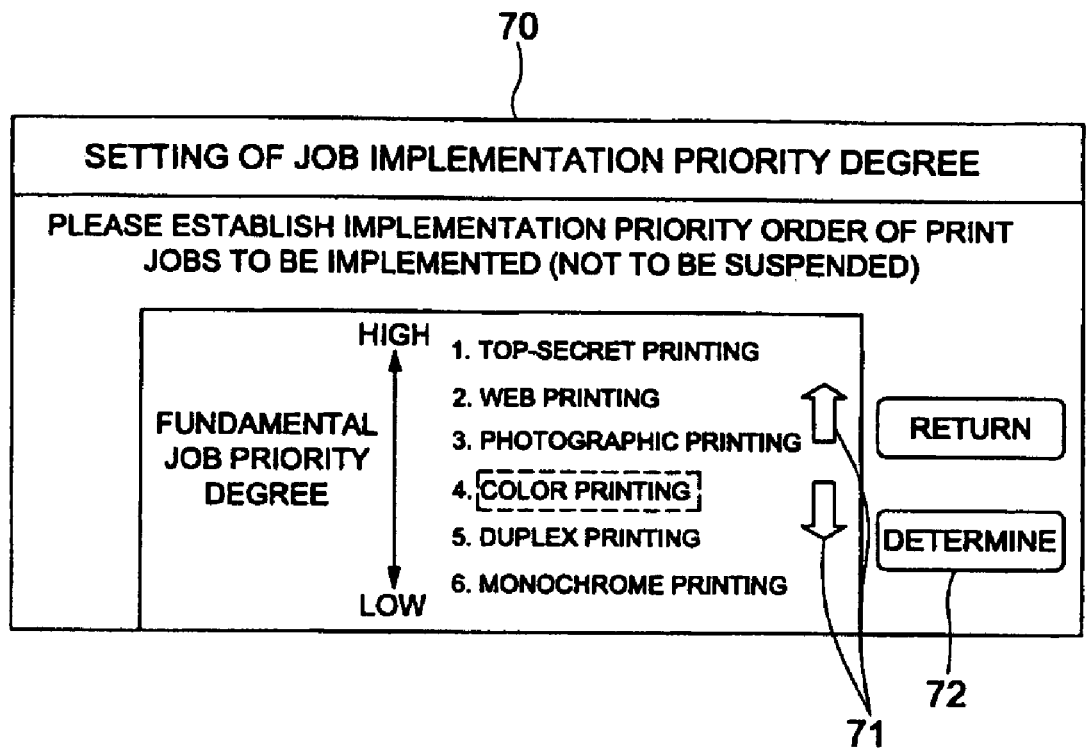
FIG. 5 is an explanatory drawing showing an example of a fundamental priority degree setting/changing screen.

The electric power consumption control system 5 is so constituted that the fundamental priority degrees are settable and changeable only by the manager or the like, who has a predetermined authority. On the other hand, the regular user is prohibited to establish or change the fundamental priority degrees. FIG. 5 shows an example of a fundamental priority degree setting/changing screen 70. When the authority for changing the fundamental priority degrees is authenticated, the fundamental priority degree setting/changing screen 70 is displayed on the display section 45 by conducting predetermined operations. An order of the fundamental priority degrees of various kinds of jobs corresponds to the aligning order of items displayed on the screen from upper to lower direction. Touching an area where a specific kind of job, such as "COLOR PRINTING", etc., is displayed, with a finger or the like, the kind of job concerned is selected as the changeable object of the fundamental priority degree. In FIG. 5, "COLOR PRINTING" is selected currently.

Successively, by operating any one of up and down keys 71, the display position of the selected kind of job is replaced with the upper adjacent position or the lower adjacent position of the other kind of job, so as to change the order of the fundamental priority degrees. Still successively, depressing a determination button 72, the order of the fundamental priority degrees currently displayed on the screen is determined as a revised order of the fundamental priority degrees and stored in the nonvolatile memory 52. Further, the Multi-Functional Peripheral 10 concerned notifies the other Multi-Functional Peripherals 10 of the revised order of the fundamental priority degrees. Receiving the revised order of the fundamental priority degrees, each of the other Multi-Functional Peripherals 10 stores it into the nonvolatile memory 52 of its own, so that the Multi-Functional Peripherals 10 residing in the electric power consumption control system 5 can jointly own the revised order of the fundamental priority degrees.

Other than the abovementioned determining operation that is only based on the fundamental priority degrees, it can be selected to determine the implementation priority of a specific job by taking other factors into account. Herein, the implementation priority is calculated by multiplying the fundamental priority degree by a coefficient based on another factor. Such the examples will be indicated in the following. In this connection, in every example as follow, the smaller the value is, the higher the rank of the implementation priority is. In other words, the implementation of the job having a smaller priority value should override that of the other job having a larger priority value.

<1> Factor in Regard to User

For instance as shown in FIG. 6(a), the coefficients, corresponding to the managerial positions and/or ranks, are registered in advance, respectively for every user, so that the fundamental priority degree of the kind of objective job is multiplied by the coefficient corresponding to the managerial position or the rank of the authenticated user (the managerial position or the rank of each of the users are stored in advance into the nonvolatile memory 52 as the user information), to calculate the implementation priority to be employed when the user concerned implements the job categorized in the concerned kind of objective job.

<Example>

(implementation priority of top-secret printing to be implemented by the regular user)=1×1  (A)

(implementation priority of Web printing to be implemented by the user equal to or higher than director)=0.4×2  (B)

Accordingly, the order of the abovementioned two implementation priorities (A) and (B), determined by taking the factors in regard to the user into account, is determined as (A)<(B).

<2> Factor in Regard to Processing Capability of Multi-Functional Peripheral 10

For instance as shown in FIG. 6(b), the coefficients, each in proportion to a printable number of paper sheets per unit hour (degree of processing capability) for every Multi-Functional Peripheral 10, are registered in advance, so that the fundamental priority degree of the kind of objective job is multiplied by the coefficient in proportion to the degree of processing capability of the Multi-Functional Peripheral 10 in which that the job is to be implemented, to calculate the implementation priority to be employed when the Multi-Functional Peripheral 10 concerned implements the job categorized in the concerned kind of objective job.

<Example>

(implementation priority of Web printing to be implemented by the high speed apparatus)=0.4×2  (D)

(implementation priority of top-secret printing to be implemented by the low speed apparatus)=1×1  (E)

Accordingly, the order of the abovementioned two implementation priorities (D) and (E), determined by taking the factors in regard to the degree of processing capability of the Multi-Functional Peripheral into account, is determined as (D)>(E).

In this connection, since the processing velocity is considered as more important rather than the electric power consumption, the concerned coefficient of the high speed apparatus is set at a value smaller than that of the medium or low speed apparatus (so that its implementation priority becomes high).

<3> Factor in Regard to State of Multi-Functional Peripheral 10

For instance as shown in FIG. 6(c), the two coefficients, one of which represents a state that the job is invested into the Multi-Functional Peripheral 10 during the time when it currently enters into a normal standby state, and another one of which represents a state that the job is invested into the Multi-Functional Peripheral 10 during the time when it currently enters into a power-saving standby state, are registered in advance, so that the fundamental priority degree of the kind of objective job is multiplied by the coefficient representing the current state of the Multi-Functional Peripheral 10 when the job is invested into the Multi-Functional Peripheral 10 concerned, to calculate the implementation priority.

<Example>

(implementation priority of Web printing that is invested during the normal standby state)=1×2     (F)

(implementation priority of photographic printing that is invested during the power-saving standby state)=0.5×3     (G)

Accordingly, the order of the abovementioned two implementation priorities (F) and (G), determined by taking the factors in regard to the state of the Multi-Functional Peripheral into account, is determined as (F)<(G).

When setting the apparatus so as to take plural factors into account, the fundamental priority degree is multiplied by the plural coefficients corresponding to the plural factors concerned.

<Example>

(implementation priority of photographic printing that is invested by the manager during the power-saving standby state)=0.5×0.7×3     (H)

(implementation priority of Web printing that is invested by the regular user during the normal standby state)=1×1×2     (I)

Accordingly, the order of the abovementioned two implementation priorities (H) and (I), determined by taking the plural factors into account, is determined as (H)>(I).

In this connection, the electric power consumption control system 5 is so constituted that, as well as the fundamental priority degrees, each of the coefficients in regard to each of the factors is settable and changeable only by the manager or the like, who has the predetermined authority. Accordingly, the regular user is prohibited to change the settings of the coefficients. Further, as well as the fundamental priority degrees, the Multi-Functional Peripheral 10 concerned notifies the other Multi-Functional Peripherals 10 of the coefficients revised by its own apparatus. Receiving the revised coefficients, each of the other Multi-Functional Peripherals 10 stores the received coefficients into the nonvolatile memory 52 of its own, so that the Multi-Functional Peripherals 10 included within the electric power consumption control system 5 can jointly own the revised coefficients.

Next, examples of the arbitration controlling operation in regard to the print job will be detailed in the following.

Figure 7:
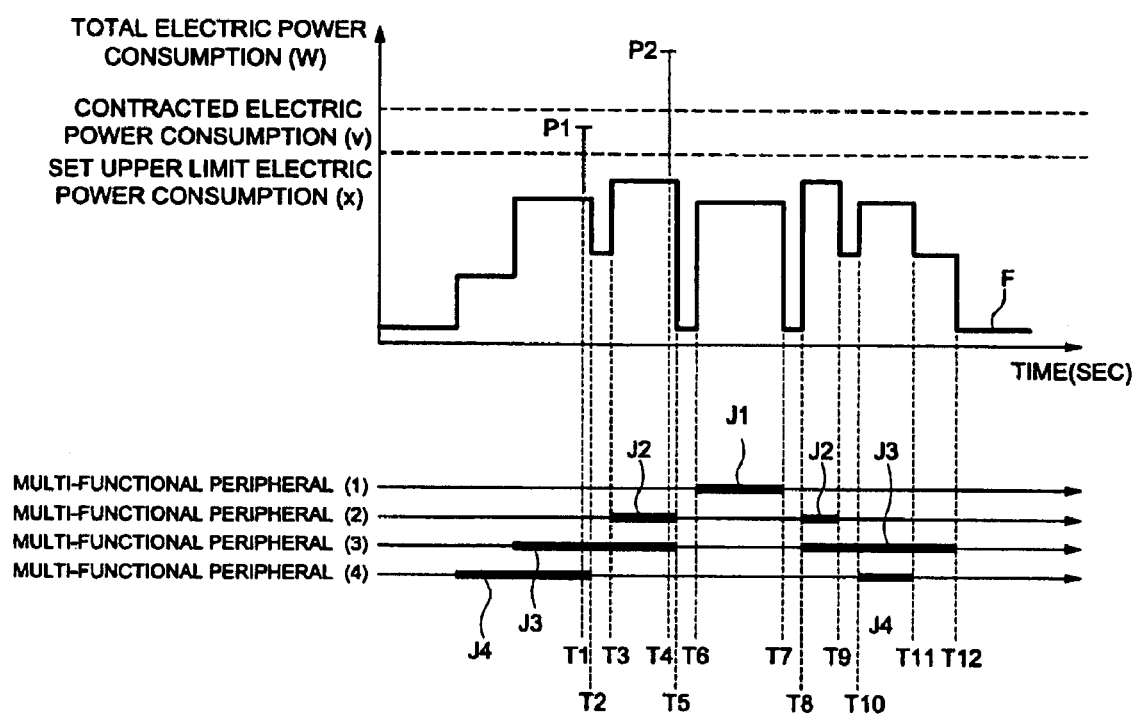
FIG. 7 is an explanatory drawing showing examples of a transition of total electric power consumption in the time domain, and transitions of job implementation states of Multi-Functional Peripherals.

FIG. 7 shows examples of a transition of the total electric power consumption in the time domain, and transitions of job implementation states of the Multi-Functional Peripherals 10. The bold solid line F, shown in FIG. 7, indicates the transition of the total electric power consumption recognized by each of the Multi-Functional Peripherals 10. Each of the plural lines located at the lower area in FIG. 7 indicates the job implementation state of each of the Multi-Functional Peripherals 10. Further, bold parts and thin parts of the plural lines indicate the job implementation states and the no-job implementation states (standby states) of the Multi-Functional Peripherals 10, respectively.

When the total electric power consumption changes according to the bold solid line F as exemplified in FIG. 7, the signals indicated as follows are exchanged between the Multi-Functional Peripherals 10, so as to achieve the arbitration between the print job operations to be implemented by the Multi-Functional Peripherals 10. In this connection, it is assumed hereinafter that the print job operations to be implemented by the Multi-Functional Peripherals (1), (2), (3), (4) are J1, J2, J3, J4, respectively, and the order of the implementation priority degrees of the print job operations J1, J2, J3, J4, is established as follow.

J1=1>J2=2>J3=3>J4=4

Further, the set upper limit electric power consumption (x), serving as the threshold value, is established as such a value that is lower than the contracted electric power consumption (v) by a certain margin value established in advance.

Now, the Multi-Functional Peripherals (4), (3) implement the print jobs J4 and J3 whose implementation priority degrees are set at 4 and 3, in this order, and after that, the print job J2 occurs in the Multi-Functional Peripheral (2) at time T1. The Multi-Functional Peripheral (2) calculates an estimated electric power consumption, to be consumed if the print job J2 is implemented, before actually implementing the print job J2, and also calculates a total electric power consumption if the print job J2 is implemented in its own apparatus (a estimated total electric power consumption P1), so as to determine whether or not the estimated total electric power consumption P1 exceeds the set upper limit electric power consumption (x).

In this example, since the estimated total electric power consumption P1 exceeds the set upper limit electric power consumption (x), the Multi-Functional Peripheral (2) transmits a power-saving mode shift inquiry signal attached with the implementation priority degree of the print job J2 to the other Multi-Functional Peripherals (1), (3), (4), so as to inquiry whether or not each of them can shift its current operating mode to the power saving mode.

Receiving the power-saving mode shift inquiry signal sent from the Multi-Functional Peripheral (2), each of the Multi-Functional Peripherals (1), (3), (4) compares the implementation priority degree, attached to the inquiry signal concerned, with that of the job, which is in mid-course of processing in its own apparatus. As a result of the comparison, when determining that the implementation priority degree of its own current job is equal to or lower than that attached to the inquiry signal concerned, the Multi-Functional Peripheral concerned sends a response, indicating a possibility of shifting to the power saving mode, to the Multi-Functional Peripheral (2), while when determining that the implementation priority degree of its own current job is higher than that attached to the inquiry signal concerned, the Multi-Functional Peripheral concerned sends a response, indicating an impossibility of shifting to the power saving mode, to the Multi-Functional Peripheral (2). In the example shown in FIG. 7, since the implementation priority degrees of both the print jobs J3 and J4 to be implemented in the Multi-Functional Peripherals (3), (4) are lower than that of the print job J2, each of the Multi-Functional Peripherals (3), (4) transmits the response indicating the possibility of shifting to the power saving mode to the Multi-Functional Peripheral (2). On the other hand, the Multi-Functional Peripherals (1), which is currently implementing no job, transmits the response indicating the impossibility of shifting to the power saving mode to the Multi-Functional Peripheral (2).

Receiving the responses sent from the other Multi-Functional Peripherals (1), (3), (4), the Multi-Functional Peripheral (2) selects a specific Multi-Functional Peripheral 10 currently operated, based on the contents of the responses in regard to the possibility or impossibility of shifting to the power saving mode, the current electric power consumptions of Multi-Functional Peripherals 10 and the estimated total electric power consumption P1, and then, transmits the power-saving mode shift signal, for requesting the Multi-Functional Peripheral 10 to shift its current operating mode to the power saving mode, to the specific Multi-Functional Peripheral 10 selected in the above. Concretely speaking, at first, the Multi-Functional Peripheral (2) selects such Multi-Functional Peripherals whose current electric power consumptions are equal to or greater than a reference value (serving as a threshold value for determining whether or not the apparatus concerned is in mid-course of implementing a job, for instance, 50 watts) among the Multi-Functional Peripherals 10 that sent back the responses indicating a possibility of shifting to the power saving mode, and then, further selects one or plural number of Multi-Functional Peripherals 10 as a receiver (or receivers) of the power-saving mode shift signal from the Multi-Functional Peripherals pre-selected in the above, so that the total sum of the current electric power consumptions of the finally selected Multi-Functional Peripherals 10 becomes minimum in a range of exceeding an electric power consumption acquired by subtracting the set upper limit electric power consumption (x) from the estimated total electric power consumption.

In the example shown in FIG. 7, the Multi-Functional Peripheral (2) transmits the power-saving mode shift signal, serving as an instruction for shifting to the power saving mode, to the Multi-Functional Peripheral (4) among the Multi-Functional Peripherals (3), (4), which sent back the responses indicating a possibility of shifting to the power saving mode, while notifies the Multi-Functional Peripheral (3) of a message indicating that it is unnecessary to shift to the power saving mode.

At time T2 after receiving the power-saving mode shift signal, the Multi-Functional Peripheral (4) completes the operation for shifting the current operating mode to the power saving mode. When the current job is suspended as a result of shifting to the power saving mode, the Multi-Functional Peripheral (4) displays a message, indicating that implementation of the job is currently suspended, on the display section 45. In addition, when the operation for shifting to the power saving mode is completed, the Multi-Functional Peripheral (4) transmits a power-saving mode shift completion signal to the Multi-Functional Peripheral (2) serving as a requester of the power-saving mode shift operation. Receiving the power-saving mode shift completion signal, the Multi-Functional Peripheral (2) commences the implementation of the print job J2 invested into its own apparatus (time T3).

During the time when the Multi-Functional Peripheral (2) is implementing the print job J2, the print job J1, having the highest implementation priority degree, occurs in the Multi-Functional Peripheral (1) at time T4. Estimated total electric power consumption P2, to be consumed when the Multi-Functional Peripheral (1) implements the print job J1, exceeds the set upper limit electric power consumption (x). Accordingly, the Multi-Functional Peripheral (1) transmits the power-saving mode shift inquiry signal attached with the implementation priority degree of the print job J1 to the other Multi-Functional Peripherals (2), (3), (4), so as to inquire whether or not each of them can shift its current operating mode to the power saving mode. Since the implementation priority degrees of both the print jobs J2 and J3 currently implemented in the Multi-Functional Peripherals (2), (3) are lower than that of the print job J1 scheduled to be implemented in the Multi-Functional Peripheral (1), each of the Multi-Functional Peripherals (2), (3) transmits the response indicating the possibility of shifting to the power saving mode to the Multi-Functional Peripheral (1).

The Multi-Functional Peripheral (1) selects a specific Multi-Functional Peripheral 10 currently operated, based on the contents of the responses in regard to the possibility or impossibility of shifting to the power saving mode, the current electric power consumptions of Multi-Functional Peripherals 10 and the estimated total electric power consumption P2, and then, transmits the power-saving mode shift signal to the specific Multi-Functional Peripheral 10 selected in the above. In the example shown in FIG. 7, the Multi-Functional Peripheral (1) determines that it is impossible to implement the print job J1 unless both the Multi-Functional Peripheral (2) and the Multi-Functional Peripheral (3) are made to shift their current operating modes to the power-saving mode, and accordingly, transmits the power-saving mode shift signal to both the Multi-Functional Peripherals (2) and (3). Receiving the power-saving mode shift signal, each of the Multi-Functional Peripherals (2) and (3) suspends the implementation of the print job J2 or J3, being currently in mid-course of processing, and shifts its operating mode to the power-saving mode (time T5).

Successively, at time T6 after receiving the power-saving mode shift completion signals sent from the Multi-Functional Peripherals (2) and (3), the Multi-Functional Peripheral (1) commences the implementation of the print job J1 invested into its own apparatus.

Still successively, at time T7 when completing the implementation of the print job J1, the Multi-Functional Peripheral (1) transmits a resumption allowance signal, for allowing each of the Multi-Functional Peripherals (2) and (3) to resume the previous operating mode from the power-saving mode (equivalent to the job completion signal), to both the Multi-Functional Peripheral (2) and Multi-Functional Peripheral (3), each of which has been made to shift into the power-saving mode.

Still successively, at time T8 when receiving the resumption allowance signal sent from the Multi-Functional Peripheral (1), the each of the Multi-Functional Peripherals (2) and (3) returns to the normal operating mode from the power-saving mode, so as to resume the implementation of the print job J2 or J3, which has been suspended.

After that, at time T9 when completing the implementation of the print job J2, the Multi-Functional Peripheral (2) transmits the resumption allowance signal to the Multi-Functional Peripheral (4), which has been made to shift into the power-saving mode.

Successively, at time T10 when receiving the resumption allowance signal sent from the Multi-Functional Peripheral (2), the Multi-Functional Peripheral (4) returns to the normal operating mode from the power-saving mode, so as to resume the implementation of the print job J4, which has been suspended. After that, the implementation of the print job J4 is completed in the Multi-Functional Peripheral (4) at time T11, and successively, the implementation of the print job J3 is completed in the Multi-Functional Peripheral (3) at time T12.

As described in the foregoing, in order to secure a margin of the electric power consumption, which is necessary for implementing the print job of its own apparatus, each of the Multi-Functional Peripherals 10 included in the electric power consumption control system 5 transmits the power-saving mode shift inquiry signal to the other Multi-Functional Peripherals 10 currently operated, so as to inquire whether or not each of them can shift its current operating mode to the power saving mode, based on the implementation priority degree. Then, the Multi-Functional Peripheral 10 concerned transmits the power-saving mode shift signal to the other Multi-Functional Peripherals 10, selected from the Multi-Functional Peripherals 10 that sent back the responses indicating the possibility of shifting to the power saving mode, within a minimum range necessary for implementing the print job scheduled to be implemented by the its own apparatus, so that the Multi-Functional Peripheral 10 concerned actually implements the scheduled print job, after creating such a state that the total amount of electric power to be consumed in the electric power consumption control system 5 does not exceed the set upper-limit electric power consumption (x) even if the scheduled print job concerned is actually implemented.

According to the abovementioned feature of the present invention, it becomes possible not only to implement the print job having a high implementation priority degree prior to the other print jobs having implementation priority degrees lower than that of the print job concerned, but also to maintain an appropriate operating state of the electric power consumption control system 5 without causing any power shutdown due to an excessive consumption of the electric power. Further, the system is so constituted that it is impossible for the regular user to intentionally or arbitrarily determine the implementation priority degree, but it is possible only for the authorized personnel, such as the manager or the like, to determine the implementation priority degree, fundamentally based on the kind of print job currently invested, and further, also based on the factors in regard to the user who invested the print job concerned, the other factors in regard to the processing capability of the Multi-Functional Peripheral 10 concerned, still the other factors in regard to the statuses of the Multi-Functional Peripheral 10 concerned, such as the normal standby mode or the power-saving standby mode, etc., etc. If the operation for determining the implementation priority degree is put in the regular user's hands, since almost of all users tend to attach a high implementation priority degree to the print job invested by himself, there has been a fear that the arbitration controlling operation based on the implementation priority degrees established by the regular users could not be functioned appropriately. On the other hand, in the electric power consumption control system 5 embodied in the present invention, since the implementation priority degrees can be established objectively and fairly on the basis of various factors, such as a kind of print job, etc., it becomes possible to maintain such an operating environment in which the arbitrating function based on the implementation priority degrees works appropriately.

Further, by setting the implementation priority degree of such a print job, which would possibly cause a little influence even if the print job concerned is temporarily suspended, at a lower rank in advance, while by setting the other implementation priority degree of another print job, which is desired not to be suspended, at a higher rank in advance, it becomes possible to appropriately conduct the arbitration controlling operation between plural print jobs, corresponding to the current situation, even if the system currently enters into the full power operating state.

Further, since the warm-up operation to be conducted at the time of the initial operations is regarded as an independent job (the warm-up job), and its activation timing is arbitrated within the electric power consumption control system 5, it becomes possible to prevent the Multi-Functional Peripheral 10 from an abrupt power shutdown, which would possibly occur at the time when the main power source of the Multi-Functional Peripheral 10 concerned is turned ON.

Next, a flowchart indicating contents of processing procedures in regard to the arbitration controlling operation to be conducted by the Multi-Functional Peripheral 10 will be detailed in the following.

Figure 8:
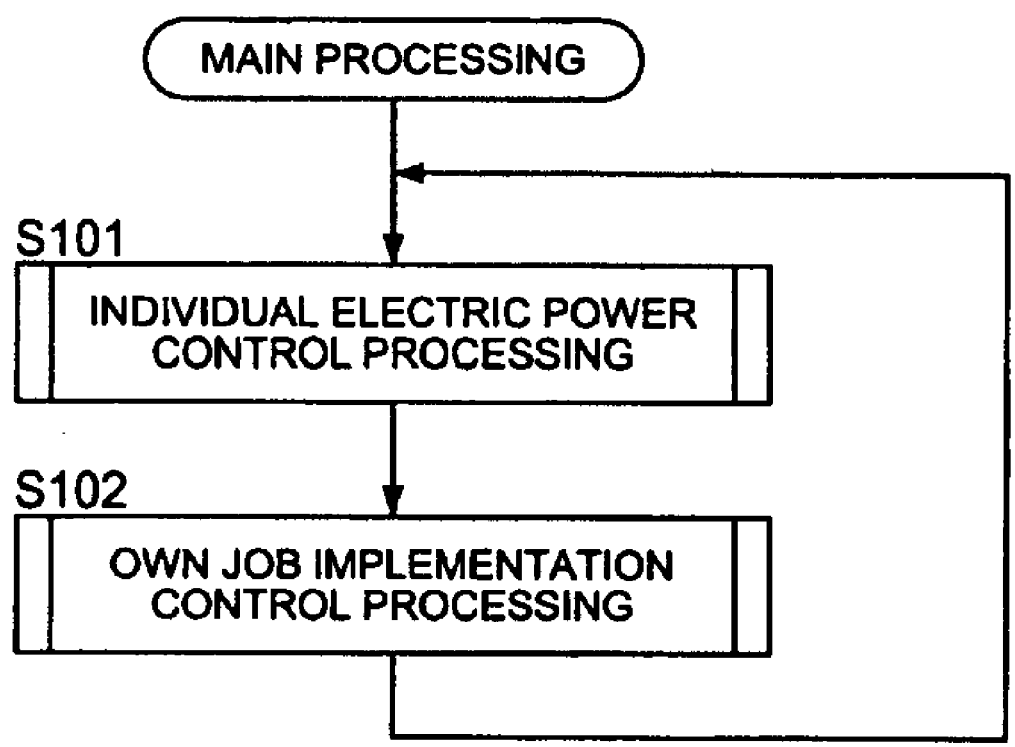
FIG. 8 shows a flowchart indicating a main processing to be conducted by a Multi-Functional Peripheral embodied in the present invention.

FIG. 8 shows a flowchart indicating a main processing to be conducted by the Multi-Functional Peripheral 10. As shown in FIG. 8, the Multi-Functional Peripheral 10 always and repeatedly conducts an individual electric power control processing (Step S101) and an own job implementation control processing (Step S102). In this connection, it is applicable that the Multi-Functional Peripheral 10 is so constituted that the main processing is conducted for every period of one second, etc.

Figure 9:
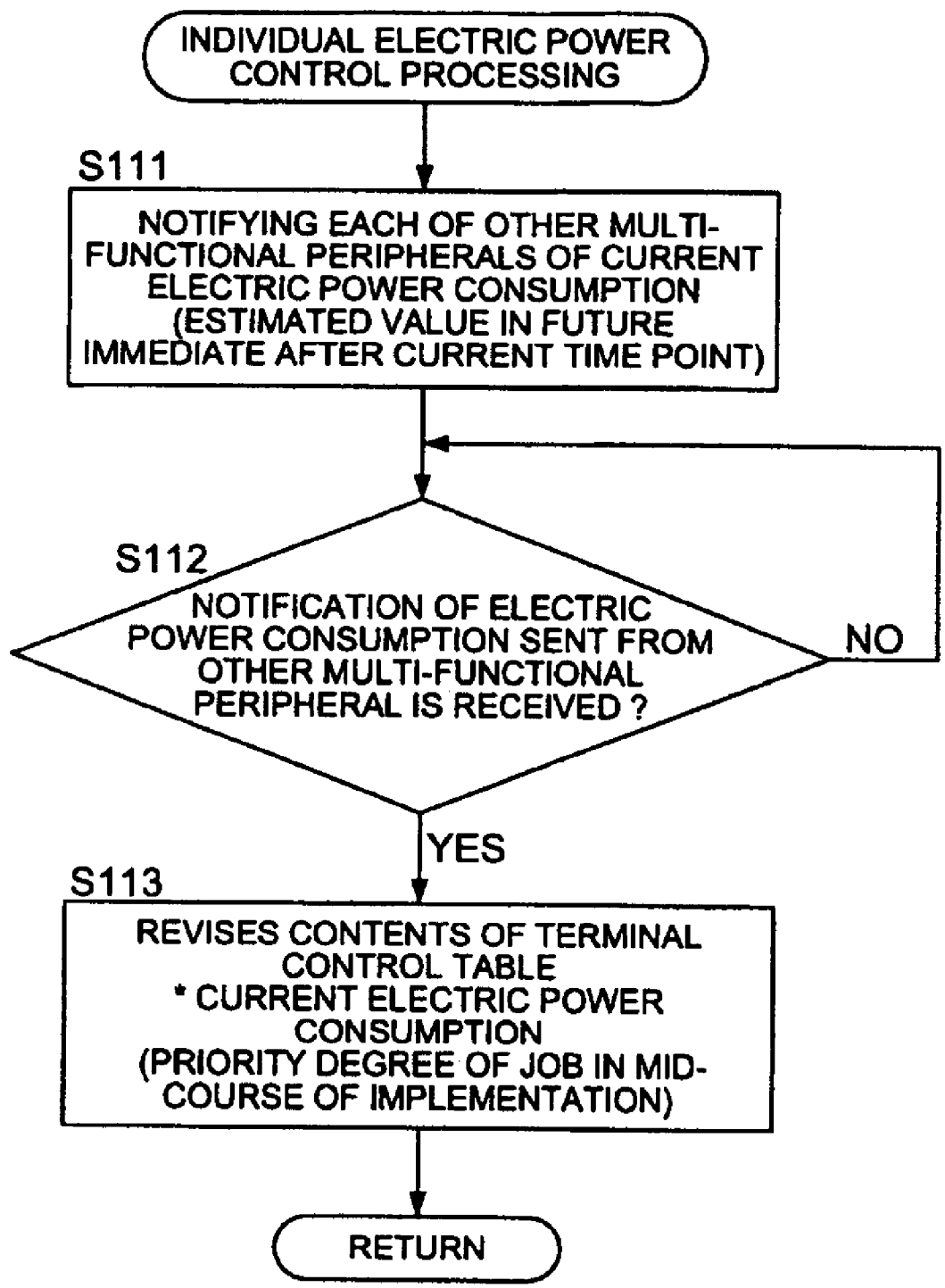
FIG. 9 shows a flowchart indicating details of an individual electric power control processing to be conducted by a Multi-Functional Peripheral embodied in the present invention.

FIG. 9 shows a flowchart indicating details of the individual electric power control processing to be conducted by the Multi-Functional Peripheral 10 (corresponding to Step S101 shown in FIG. 8). At first, the Multi-Functional Peripheral 10 notifies each of the other Multi-Functional Peripherals 10 of the current electric power consumption (Step S111). As aforementioned, the current electric power consumption is defined as such the electric power consumption that corresponds to the implementation status of the job in future immediately after the current time point (for instance, at one second future from the current time point). When receiving the abovementioned notification sent from the other Multi-Functional Peripheral 10 (Step S112; YES), the received Multi-Functional Peripheral 10 revises a current electric power consumption 62, corresponding to the Multi-Functional Peripheral 10 serving as the sender of the notification concerned and stored in the terminal control table 60, to the newly notified value of the current electric power consumption (Step S113). According to the abovementioned process, the terminal control table 60 is always revised to new one including latest information.

FIGS. 10 through 17 show details of the own job implementation control processing to be conducted by the Multi-Functional Peripheral 10 (corresponding to Step S102 shown in FIG. 8). In this processing, the Multi-Functional Peripheral 10 determines contents to be processed, based on the notification sent from the other Multi-Functional Peripheral 10, the receiving status of the signal and/or the state of its own apparatus, and then, implements the processing concerned. The abovementioned determining operation is conducted through the process from Step S201 to Step S212 shown in FIG. 10. In the following, the various processing will be detailed case by case for every determined result.

Case A: New Job Occurs in its Own Apparatus (Step S207; Yes, Shown in FIG. 10 and Continue to Arrow 2 Shown in FIG. 11)

A job occurrence takes palace at the time when the user invests a new job into the Multi-Functional Peripheral 10, at the time when the time point for implementing the warm-up job arrives after the main power source is turned ON, etc. Hereinafter, the abovementioned job is referred to as an implementation scheduled job. At first, the Multi-Functional Peripheral 10 calculates an estimated value of the electric power consumption (estimated electric power consumption) necessary for implementing the implementation scheduled job (Step S221 shown in FIG. 11), and successively, calculates the total electric power consumption by totally summing up the current electric power consumptions 62 of the Multi-Functional Peripherals 10, which are registered in the terminal control table 60, (Step S222). Still successively, the Multi-Functional Peripheral 10 concerned further calculates the estimated total electric power consumption, being the total electric power consumption when the implementation scheduled job is actually implemented, so as to determine whether or not the value of the estimated total electric power consumption exceeds the set upper limit electric power consumption (x) (Step S223).

When the estimated total electric power consumption exceeds the set upper limit electric power consumption (x) (Step S223; YES), the Multi-Functional Peripheral 10 concerned calculates the implementation priority degree of the implementation scheduled job (Step S224), and then, transmits the power-saving mode shift inquiry signal attached with information representing the above-calculated implementation priority degree to the other Multi-Functional Peripherals 10, so as to inquire whether or not each of them can shift its current operating mode to the power saving mode (Step S225). After that, the Multi-Functional Peripheral 10 concerned establishes a waiting status for waiting the responses to the power-saving mode shift inquiry signal as its own status information (Step S226), and finalizes the processing (END shown in FIG. 10, as continuation from arrow 8 shown in FIG. 11).

When the scheduled total electric power consumption does not exceed the set upper limit electric power consumption (x) (Step S223; NO), the Multi-Functional Peripheral 10 concerned commences the implementation of the implementation scheduled job (Step S231 shown in FIG. 12, as continuation from arrow 3 shown in FIG. 11), and establishes a job completion waiting status as its own status information (Step S232), and finalizes the processing (END shown in FIG. 10, as continuation from arrow 8 shown in FIG. 12).

Case B: Inquiry in Regard to Possibility or Impossibility of Shifting to Power Saving Mode is Received from Other Multi-Functional Peripheral 10 (Step S201; Yes, Shown in FIG. 10 and Continue to Arrow 6 Shown in FIG. 13)

Figure 13:
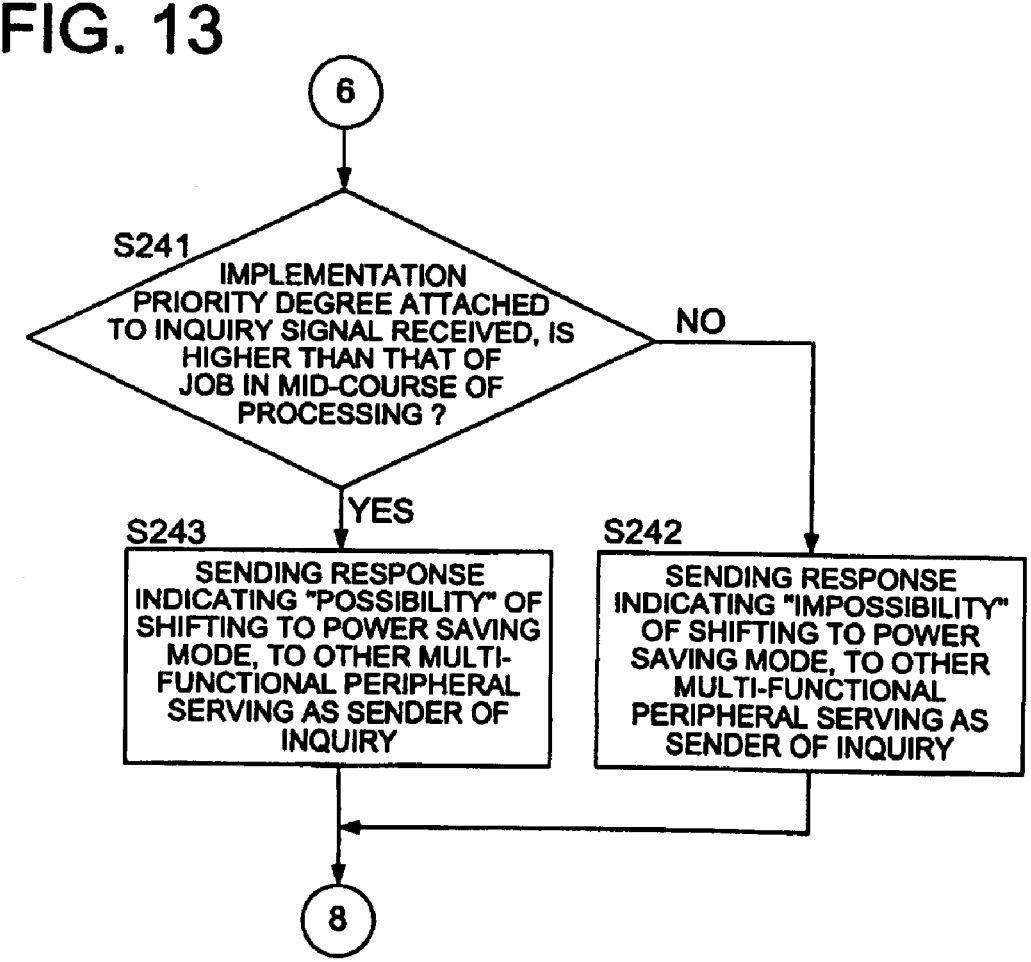
FIG. 13 shows a flowchart indicating a part (to be conducted when a Multi-Functional Peripheral receives an inquiry, in regard to a possibility or impossibility of shifting to the power saving mode, from another Multi-Functional Peripheral) of an own job implementation control processing to be conducted by a Multi-Functional Peripheral embodied in the present invention.
Figure 14:
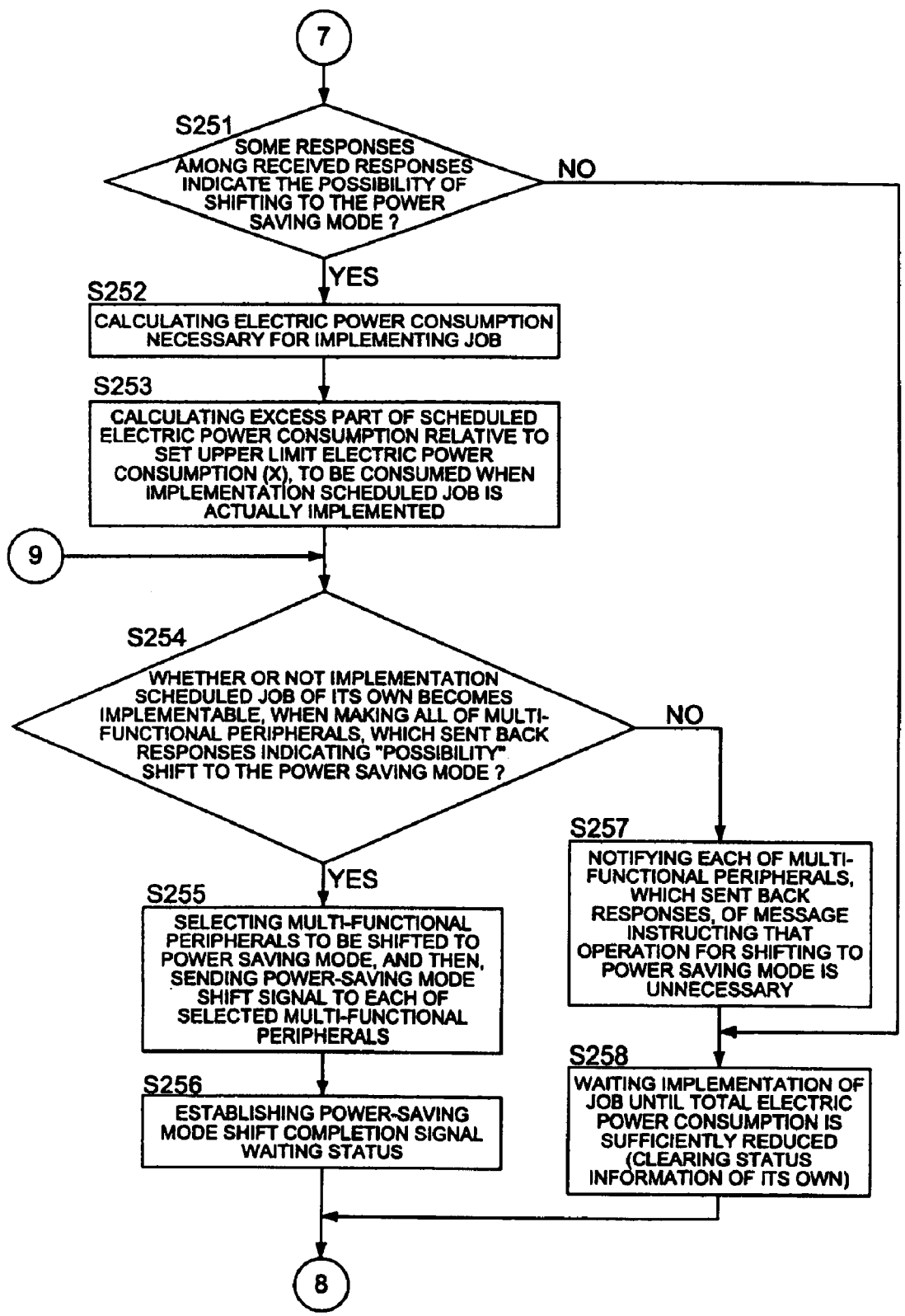
FIG. 14 shows a flowchart indicating a part (to be conducted when a Multi-Functional Peripheral receives a response to an inquiry, in regard to a possibility or impossibility of shifting to the power saving mode, from another Multi-Functional Peripheral) of an own job implementation control processing to be conducted by a Multi-Functional Peripheral embodied in the present invention.
Figure 15:
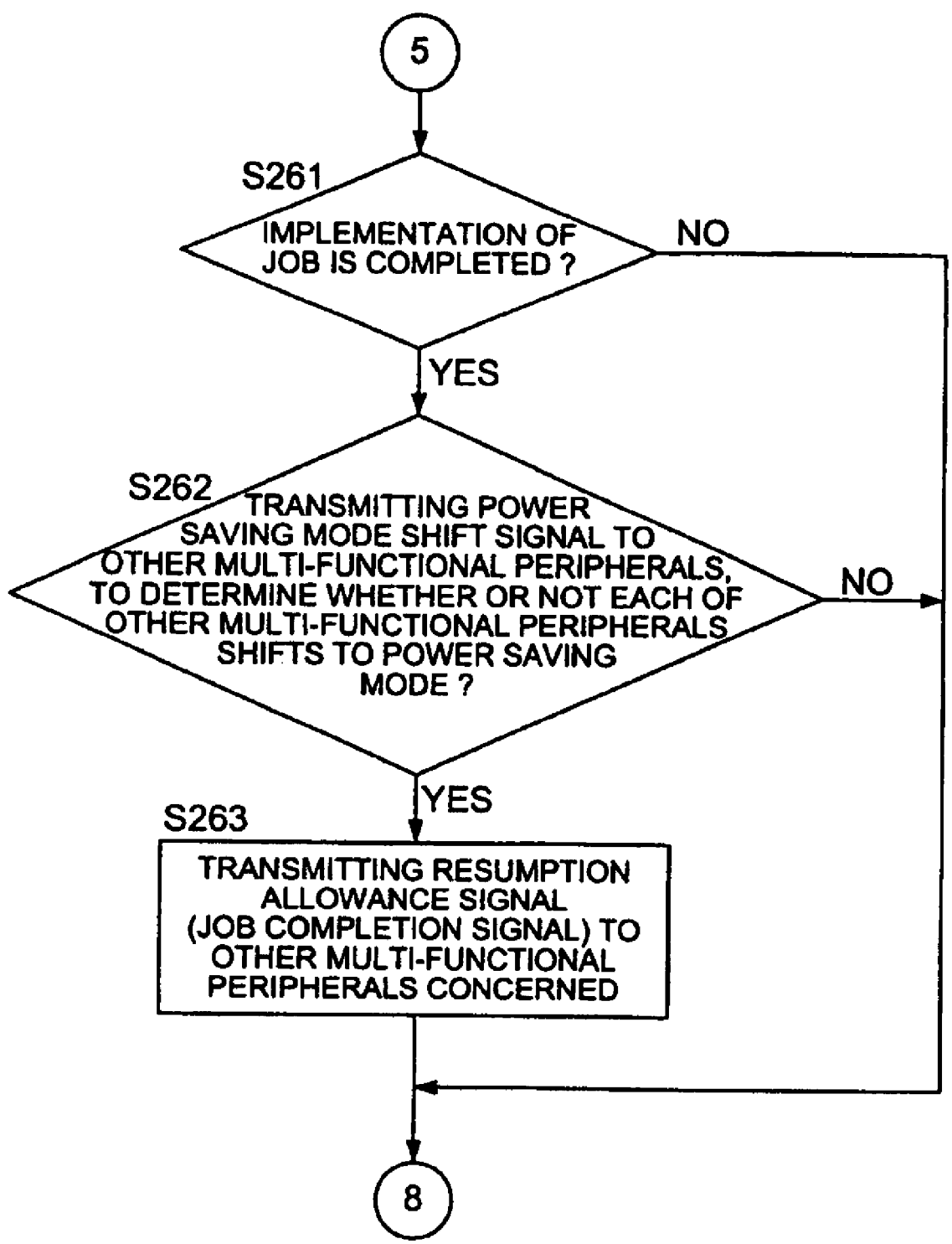
FIG. 15 shows a flowchart indicating a part (to be conducted when a Multi-Functional Peripheral is in a state of waiting a completion of a job) of an own job implementation control processing to be conducted by a Multi-Functional Peripheral embodied in the present invention.

The Multi-Functional Peripheral 10 concerned compares the implementation priority degree, attached to the inquiry signal received, with that of the job, which is in mid-course of processing in its own apparatus (Step S241 shown in FIG. 13). As a result of the comparison, when determining that the implementation priority degree of its own current job is equal to or higher than that attached to the inquiry signal received (Step S241; NO), the Multi-Functional Peripheral 10 concerned sends a response, indicating an impossibility of shifting to the power saving mode, to the other Multi-Functional Peripheral serving as the sender of the inquiry (Step S242), and finalizes the processing (END shown in FIG. 10, as continuation from arrow 8 shown in FIG. 13). On the other hand, when determining that the implementation priority degree of its own current job is lower than that attached to the inquiry signal received (Step S241; YES), the Multi-Functional Peripheral 10 concerned sends a response, indicating a possibility of shifting to the power saving mode, to the other Multi-Functional Peripheral serving as the sender of the inquiry (Step S243), and finalizes the processing (END shown in FIG. 10, as continuation from arrow 8 shown in FIG. 13).

Case C: Responses to Inquiry in Regard to Possibility or Impossibility of Shifting to Power Saving Mode are Received from Other Multi-Functional Peripherals 10 (Step S210; Yes, Shown in FIG. 10 and Continue to Arrow 7 Shown in FIG. 14)

Hereinafter, it is assumed that all of the other Multi-Functional Peripherals 10, serving as the receivers of the inquiry, sent back the responses. When determining that none of the received responses indicate the possibility of shifting to the power saving mode (Step S251; NO), the Multi-Functional Peripheral 10 concerned conducts such a processing that it waits the implementation of the job until the total electric power consumption is sufficiently reduced (reduced to a level lower than the predetermined value), etc., and at the same time, clears the status information of its own (Step S258), and then, finalizes the processing (END shown in FIG. 10, as continuation from arrow 8 shown in FIG. 14).

When determining that some responses among the received responses indicate the possibility of shifting to the power saving mode (Step S251; YES), the Multi-Functional Peripheral 10 concerned calculates an excess part of the estimated electric power consumption relative to the set upper limit electric power consumption (x), to be consumed when the implementation scheduled job is actually implemented (Step S253). Then, the Multi-Functional Peripheral 10 concerned determines whether or not the implementation scheduled job of its own becomes implementable, due to the reduction of an electric power consumption greater than the above-mentioned excess part, caused by making all of the Multi-Functional Peripherals 10, which sent back the responses indicating the possibility of shifting to the power saving mode, shift to the power saving mode (Step S254). When determining that it does not become implementable (Step S254; NO), the Multi-Functional Peripheral 10 concerned notifies each of the Multi-Functional Peripherals 10, which sent back the responses indicating the possibility of shifting to the power saving mode, of a message instructing that the operation for shifting to the power saving mode is unnecessary (Step S257), and successively, conducts such a processing that it waits the implementation of the job until the total electric power consumption is sufficiently reduced (reduced to a level lower than the predetermined value), etc., and at the same time, clears the status information of its own (Step S258), and then, finalizes the processing (END shown in FIG. 10, as continuation from arrow 8 shown in FIG. 14).

When determining that it becomes implementable (Step S254; YES), the Multi-Functional Peripheral 10 concerned selects a minimum number of Multi-Functional Peripherals 10, which makes it possible to reduce the electric power consumption by an amount greater that that of the aforementioned excess part, from the Multi-Functional Peripherals 10, which sent back the responses indicating the possibility of shifting to the power saving mode, as the requestee to be shifted to the power saving mode, and successively, transmits the power-saving mode shift signal to the Multi-Functional Peripherals 10 selected in the above, and at the same time, registers the Multi-Functional Peripherals 10, serving as the receivers of the power-saving mode shift signal, into the column of the requestee information 64 in the terminal control table 60 (Step S255). Still successively, the Multi-Functional Peripheral 10 concerned establishes a power-saving mode shift completion signal waiting status as its own status information (Step S256), and finalizes the processing (END shown in FIG. 10, as continuation from arrow 8 shown in FIG. 14).

Case D: Power-Saving Mode Shift Completion Signal is Received From Other Multi-Functional Peripheral 10 During Power-Saving Mode Shift Completion Signal Waiting Status (Step S211; Yes, Shown in FIG. 10 and Continue to Arrow 3 Shown in FIG. 12)

Figure 10:
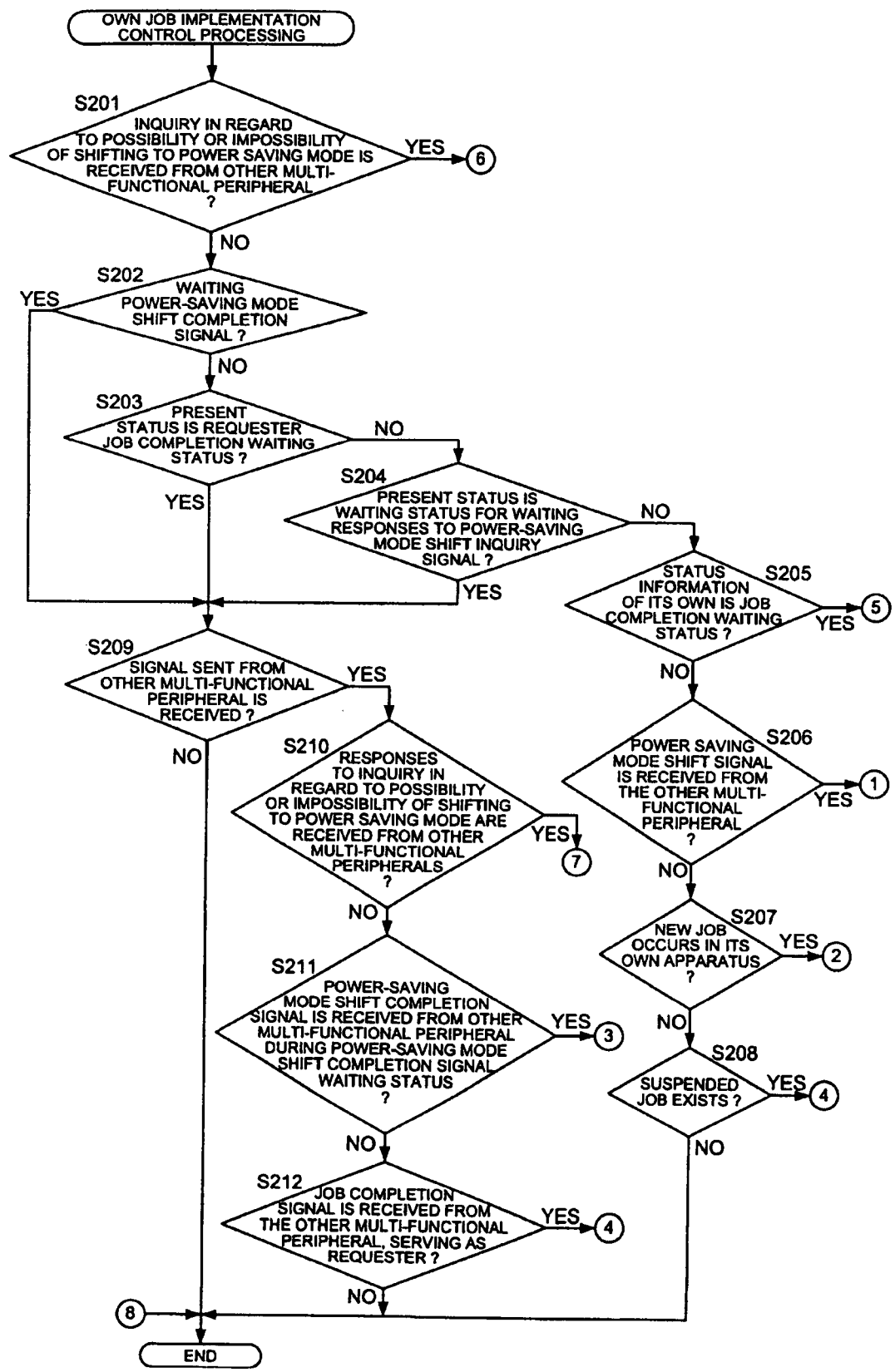
FIG. 10 shows a flowchart indicating a part (branch determining operations) of an own job implementation control processing to be conducted by a Multi-Functional Peripheral embodied in the present invention.
Figure 12:
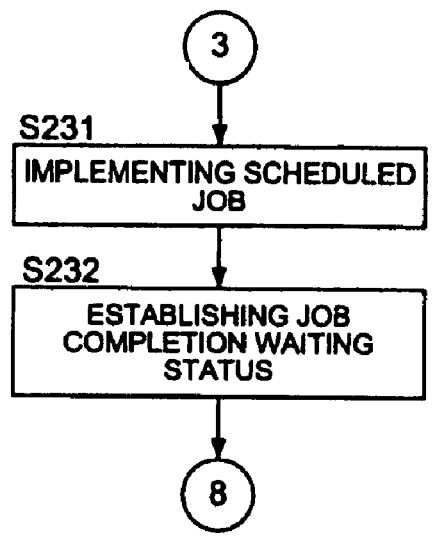
FIG. 12 shows a flowchart indicating a part (commencement of job implementation) of an own job implementation control processing to be conducted by a Multi-Functional Peripheral embodied in the present invention.

The Multi-Functional Peripheral 10 concerned commences the implementation of the implementation scheduled job (Step S231 shown in FIG. 12), and establishes a job completion waiting status as its own status information (Step S232), and finalizes the processing (END shown in FIG. 10, as continuation from arrow 8 shown in FIG. 12).

Case E: Status Information of its Own is Job Completion Waiting Status (Step S205; Yes, Shown in FIG. 10 and Continue to Arrow 5 Shown in FIG. 15)

When the implementation of the job is completed (Step S261; YES, shown in FIG. 15), referring to the requestee information 64 in the terminal control table 60, the Multi-Functional Peripheral 10 concerned transmits the power saving mode shift signal to the other Multi-Functional Peripherals 10, so as to determine whether or not each of the other Multi-Functional Peripherals 10 is made to shift to the power saving mode (Step S262). When determining that the other Multi-Functional Peripheral 10 is made to shift to the power saving mode (Step S262; YES), the Multi-Functional Peripheral 10 concerned transmits the resumption allowance signal (equivalent to the job completion signal) to the other Multi-Functional Peripheral 10 concerned, so as to resume the normal operating mode from the power-saving mode (Step S263), and finalizes the processing (END shown in FIG. 10, as continuation from arrow 8 shown in FIG. 12). In this connection, with respect to the receiver of the resumption allowance signal, the Multi-Functional Peripheral 10 concerned clears the requestee information 64 in the terminal control table 60, and when not in Step S261 or Step S262, finalizes the processing as it is (END shown in FIG. 10, as continuation from arrow 8 shown in FIG. 12).

Case F: Power Saving Mode Shift Signal is Received from the Other Multi-Functional Peripheral 10 (Step S206; Yes, Shown in FIG. 10 and Continue to Arrow 1 Shown in FIG. 16)

At first, in order to avoid a jam occurrence, the Multi-Functional Peripheral 10 concerned conducts a print deactivation processing (Step S271). In the print deactivation processing, the operation for forming a new toner image onto the photoreceptor drum 24 is deactivated, and at the same time, the photoreceptor drum 24 is made to rotate at an angle equivalent to ((length of paper sheet ejecting path)−(one revolution length)), so as to erase the residual latent image remaining on the circumferential surface of the photoreceptor drum 24. Further, at this time, a recording paper sheet, located at a position nearer to the paper sheet ejecting tray 22 rather than the photoreceptor drum 24, is conveyed in the normal direction as it is, so as to eject it onto the paper sheet ejecting tray 22. Still further, the stamping section 32 stamps a predetermined seal indicating that the Multi-Functional Peripheral 10 concerned enters into the power-saving mode in mid-course of the print outputting process for this recording paper sheet, and when the abovementioned ejecting operation is completed, the electric power supply to the fixing device 31 is turned OFF. Yet further, another recording paper sheet, advanced into the conveyance path 23 located at a position nearer to the paper sheet feeding tray 21 rather than the photoreceptor drum 24, is recovered into the non-recorded paper sheet ejecting tray 33 by moving the guide plate 34a upward.

In this connection, if the length of a path A extended from the photoreceptor drum 24 to the paper sheet ejecting tray 22 (shown in FIG. 2) is equal to the other length of a path B extended from a position, which is located upstream the photoreceptor drum 24 and from which the recording paper sheet is to be separated from the conveyance path 23 by the guide plate 34a, to the non-recorded paper sheet ejecting tray 33, the recording paper sheet being in mid-course of the conveying operation will be ejected into either the paper sheet ejecting tray 22 or the non-recorded paper sheet ejecting tray 33, only by conveying the recording paper sheet by that length as a fixed length, and the recording paper sheet would never remain within a range of the conveyance path 23. However, while the recording paper sheet is passing through the section of the conveyance path 23 located above the guide plate 34a, the guide plate 34a is controlled not to elevate toward the conveyance path 23.

It is applicable that the seal to be stamped by the stamping section 32 is either a simple mark, such as a circle seal or the like, or information representing a page position in the print job concerned, for instance, a (page number)/(total number of pages), a (current number of copies)/(total number of copies), etc. Further, it is also applicable that the Multi-Functional Peripheral 10 is so constituted that the recording paper sheet, located at a position nearer to the paper sheet feeding tray 21 rather than the photoreceptor drum 24, is conveyed back to the paper sheet feeding tray 21 by reversing its conveying direction.

Figure 16:
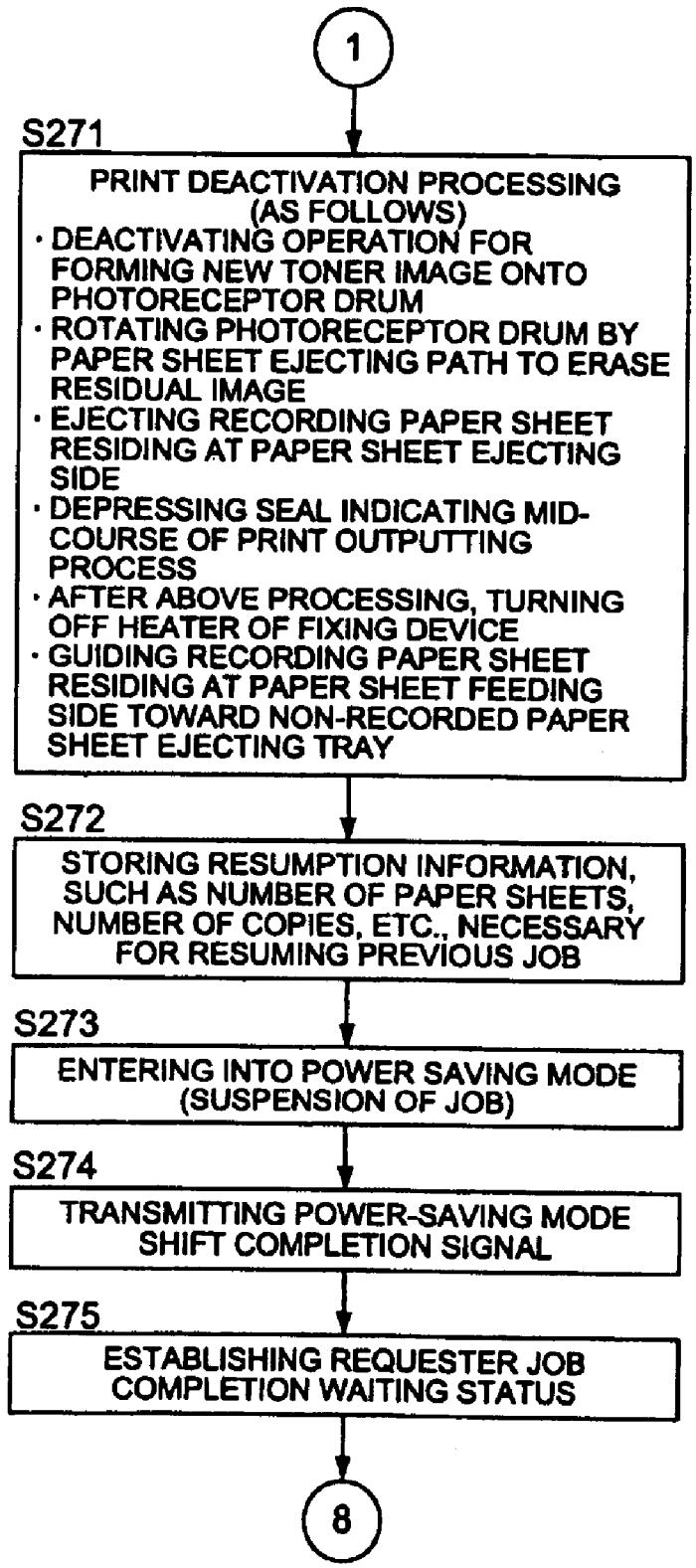
FIG. 16 shows a flowchart indicating a part (to be conducted when a Multi-Functional Peripheral receives a power-saving mode shift signal from another Multi-Functional Peripheral) of an own job implementation control processing to be conducted by a Multi-Functional Peripheral embodied in the present invention.
Figure 17:
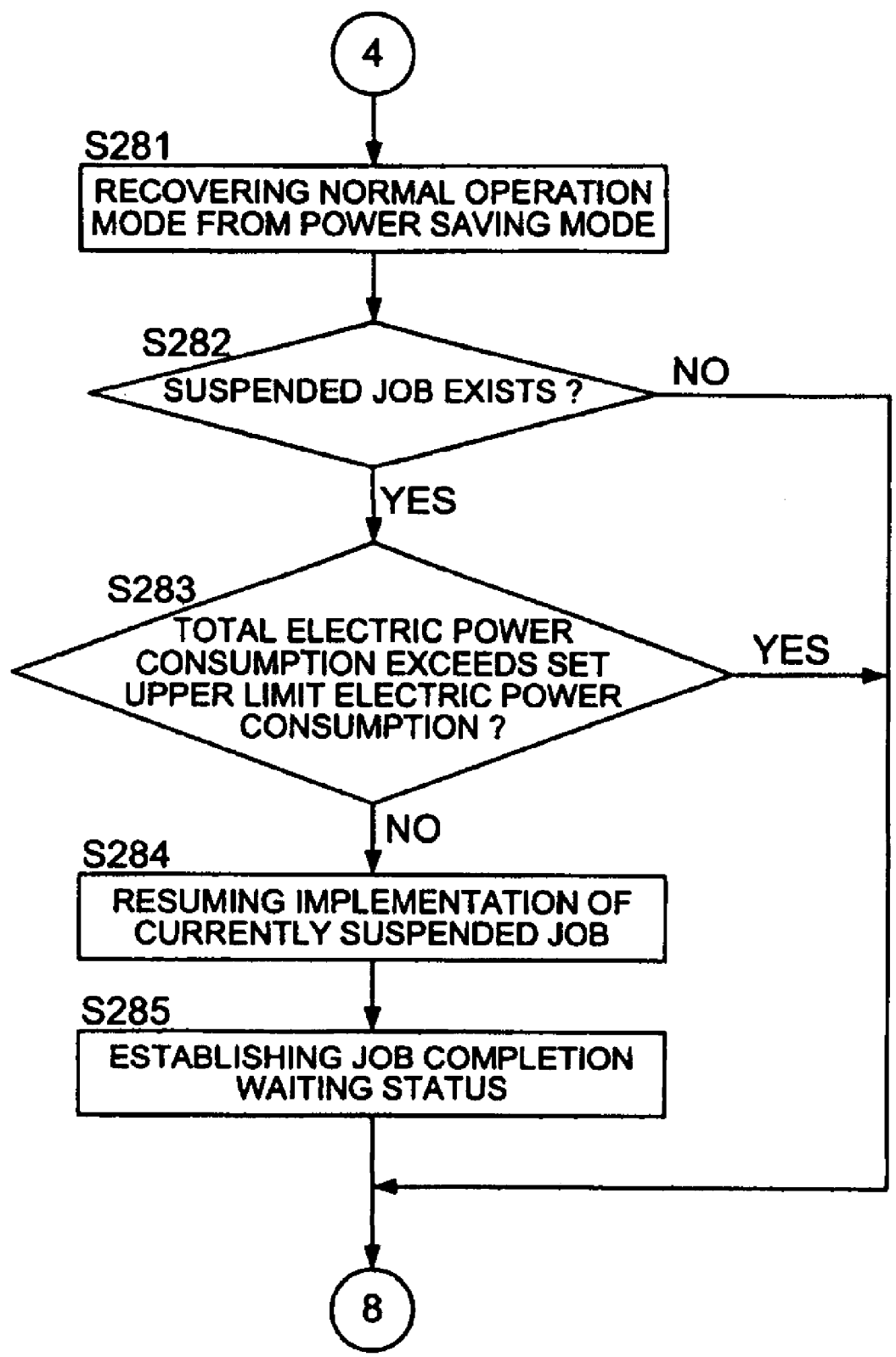
FIG. 17 shows a flowchart indicating a part (to be conducted when a Multi-Functional Peripheral receives a resumption allowance signal from another Multi-Functional Peripheral) of an own job implementation control processing to be conducted by a Multi-Functional Peripheral embodied in the present invention.

Returning to the flowchart shown in FIG. 16, successively, the Multi-Functional Peripheral 10 concerned stores various kinds of information (resumption information, including, for instance, a page number from which the print job is resumed, a number of copies, etc.) necessary for resuming the previous job, which is to be suspended associated with the operation for sifting to the power saving mode, when recovering from the power saving mode, (Step S272), and suspends the print job concerned, so as to enter into the power saving mode (Step S273). When suspending the print job due to the shift to the power saving mode, the display section 45 is made to display a message indicating that implementation of the print job is currently suspended. Further, the Multi-Functional Peripheral 10 concerned transmits the power-saving mode shift completion signal to the Multi-Functional Peripheral 10 serving as the sender of the power-saving mode shift signal (Step S274), and establishes a requester job completion waiting status as its own status information (Step S275), and finalizes the processing (END shown in FIG. 10, as continuation from arrow 8 shown in FIG. 16). In this connection, when receiving the power-saving mode shift signal sent from the other Multi-Functional Peripheral 10, the Multi-Functional Peripheral 10 concerned registers the sender of the power-saving mode shift signal into the requester information 63 in the terminal control table 60.

Case G: During Requester Job Completion Waiting Status, Resumption Allowance Signal (Job Completion Signal) is Received from the Other Multi-Functional Peripheral 10, Serving as Requester (Sender of Power-Saving Mode Shift Signal) (Step S212, Shown in FIG. 10 and Continue to Arrow 4 Shown in FIG. 17)

The Multi-Functional Peripheral 10 concerned recovers the normal operation mode from the power saving mode, and clears the concerned requester information 63 stored in the terminal control table 60 (Step S281), and successively, determines whether or not the suspended job exists (Step S282), and still successively, when determining that the suspended job does not exist (Step S282; NO), finalizes the processing (END shown in FIG. 10, as continuation from arrow 8 shown in FIG. 17), while, when determining that the suspended job exists (Step S282; YES), determines whether or not the total electric power consumption exceeds the set upper limit electric power consumption (x) when the implementation of the currently-suspended job is resumed (Step S283). When determining that the total electric power consumption does not exceed the set upper limit electric power consumption (x) (Step S283; NO), the Multi-Functional Peripheral 10 concerned resumes the implementation of the currently suspended job, based on the resumption information (Step S284), and successively, establishes a job completion waiting status as its own status information (Step S285), and then, finalizes the processing (END shown in FIG. 10, as continuation from arrow 8 shown in FIG. 17). Alternatively, it is also applicable that the Multi-Functional Peripheral 10 concerned conducts the arbitration controlling operation of the currently suspended job as well as in the case that the newly invested job is made to implement.

Although, referring to the drawings, the preferred embodiment of the present invention has been detailed in the foregoing, the scope of the present invention is not limited to the aforementioned embodiment. Modifications and additions made by a skilled person without departing from the spirit and scope of the invention shall be included in the scope of the present invention.

For instance, although the electric power consumption control system 5 embodied in the present invention is so constituted that the Multi-Functional Peripheral 10 asks the other Multi-Functional Peripheral 10 for possibility or impossibility of shifting to the power-saving mode so that the other Multi-Functional Peripheral 10 compares the implementation priority degrees of the concerned jobs to determine the possibility or impossibility of shifting to the power-saving mode, and sends the determining result back to the Multi-Functional Peripheral 10 serving as the sender of the inquiry, it is also applicable that the system is so constituted that the Multi-Functional Peripherals 10 included in the electric power consumption control system 5 always and bilaterally communicate the implementation priority degrees of the jobs, currently implemented in the system, with each other, to jointly own those information among them, so as to determine to which Multi-Functional Peripheral 10 the power-saving mode shift signal should be transmitted, based on the common information jointly owned by the Multi-Functional Peripherals 10.

FIG. 18 shows an example of a terminal device controlling common table 80 to be employed when the Multi-Functional Peripherals 10 included in the electric power consumption control system 5 jointly own a lot of information. Various kinds of items in regard to each of the Multi-Functional Peripherals 10, such as an operating status, requestee information, requester information, a current electric power consumption, an implementation priority degree of a job currently implemented or suspended, etc., are registered in the terminal device controlling common table 80, and are jointly owned by the Multi-Functional Peripherals 10.

The item of "SLEEP" written in the column of "OPERATING STATUS" indicates that the Multi-Functional Peripheral 10 concerned is currently entered into the power saving mode according to the power-saving mode shift signal received from the other Multi-Functional Peripheral 10, while the item of "OPERATING" indicates that the Multi-Functional Peripheral 10 concerned is currently operated in the normal operating mode.

According to the exemplified table shown in FIG. 18, it can be recognized that the Multi-Functional Peripheral (1) transmits the power-saving mode shift signal to the Multi-Functional Peripheral (2) so as to make the Multi-Functional Peripheral (2) enter into the power saving mode (refer to section 81 shown in FIG. 18), and implements the print job of its own. Further, it can be also recognized the fact that the Multi-Functional Peripheral (2) receives the power-saving mode shift signal from the Multi-Functional Peripheral (1) (refer to section 82 shown in FIG. 18), and the other fact that the Multi-Functional Peripheral (2) transmits the power-saving mode shift signal to the Multi-Functional Peripherals (4) and (5) so as to make them enter into the power saving mode (refer to section 83 shown in FIG. 18). Still further, it can be also recognized the fact that the Multi-Functional Peripheral (4) receives the power-saving mode shift signal from the Multi-Functional Peripheral (2) (refer to section 84 shown in FIG. 18), the other fact that the Multi-Functional Peripheral (5) receives the power-saving mode shift signal from the Multi-Functional Peripheral (2) (refer to section 85 shown in FIG. 18), etc.

Figure 11:
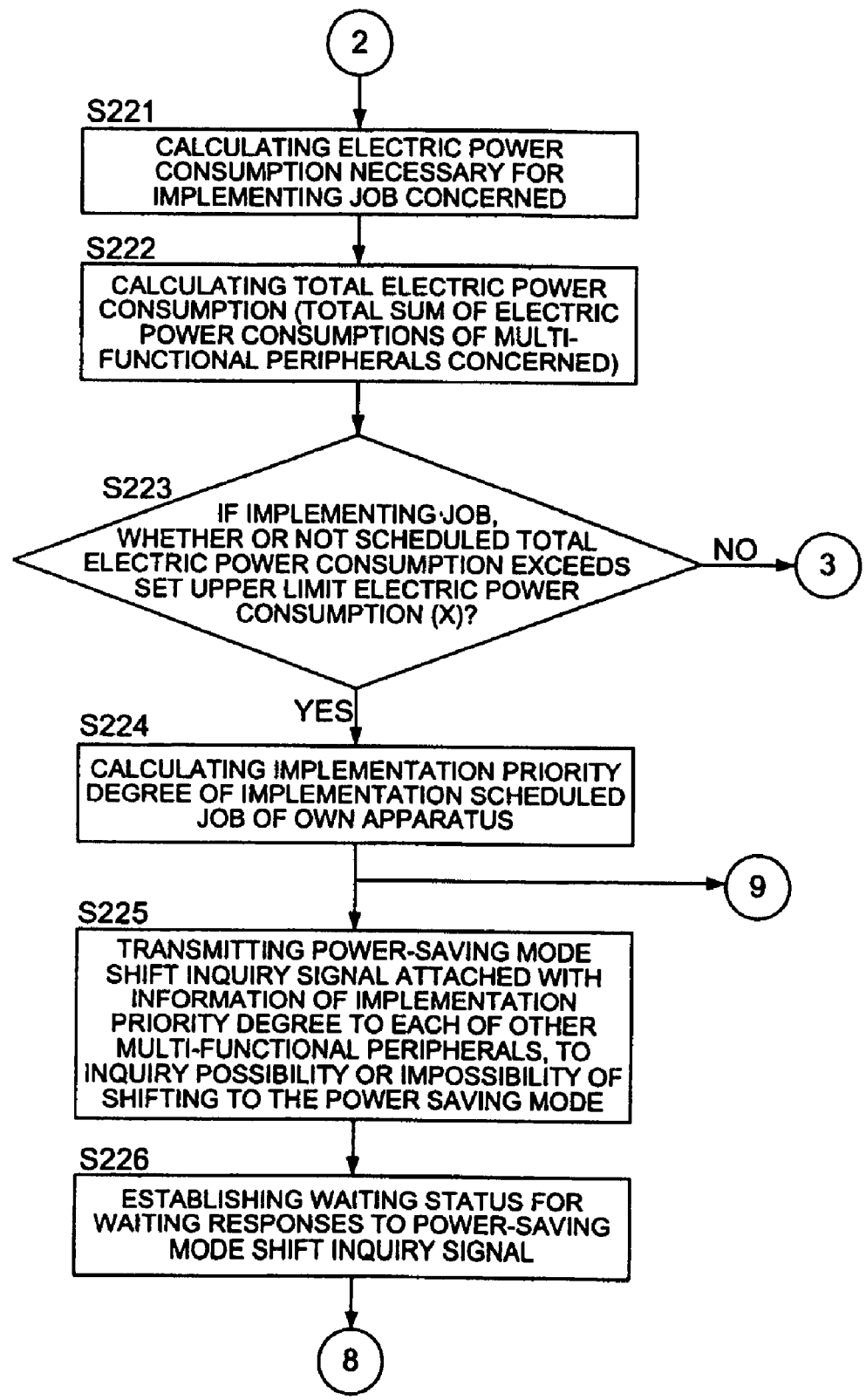
FIG. 11 shows a flowchart indicating a part (to be conducted when a new job occurs) of an own job implementation control processing to be conducted by a Multi-Functional Peripheral embodied in the present invention.

The information to be jointly owned is not limited to the abovementioned, but may be arbitral information including one or more of the abovementioned. Further, it is applicable that other information is also jointly owned in addition to the above. In this connection, when the implementation priorities of the print jobs are jointly owned, since none of the Multi-Functional Peripherals 10 performs the operation for inquiring the possibility or impossibility of sifting to the power saving mode, it is applicable that the process of the flowchart proceeds to the Step S254 shown in FIG. 14 through arrow 9 after the implementation of the Step S224 shown in FIG. 11 is completed.

Further, it is also applicable that, when inquiring the possibility or impossibility of sifting to the power saving mode from the other Multi-Functional Peripheral(s) 10, the receiver(s) of the inquiry concerned is/are limited only to the other Multi-Functional Peripheral(s) 10 that is/are currently in mid-course of implementing a certain job. For instance, even in such the case that only the current electric power consumption is notified and is jointly owned among the Multi-Functional Peripherals 10, it is applicable that when the current electric power consumption notified by the other Multi-Functional Peripheral 10 (Multi-Functional Peripheral (4) in the exemplified table shown in FIG. 4) is lower than the predetermined value (for instance, 50 watts), the Multi-Functional Peripheral 10 concerned determines that the other Multi-Functional Peripheral 10 is not currently in mid-course of implementing a certain job, and excludes the other Multi-Functional Peripheral 10 from the receivers of the inquiry, based on the above determined result.

When the implementation priorities to be compared with each other are the same, although the receiver of the inquiry sends a response indicating the impossibility of sifting to the power saving mode back to the sender of the inquiry in the aforementioned preferred embodiment, it is also applicable that the receiver of the inquiry sends a response indicating the possibility of sifting to the power saving mode back to the sender of the inquiry, or it is also applicable to establish in advance any one of the possibility or impossibility of sifting to the power saving mode as the response for the inquiry and to determine it in a changeable manner.

Further, it is also applicable that the system is so constituted that the Multi-Functional Peripheral 10 sends the response indicating the impossibility of sifting to the power saving mode back to the sender of the inquiry, which is received during the time when the Multi-Functional Peripheral 10 concerned already enters into the power saving mode or implements no job. According to the above configuration, it becomes possible for the sender of the inquiry to exclude the Multi-Functional Peripheral 10 concerned from the receivers of the power-saving mode shift signal without determining whether or not the electric power consumption of Multi-Functional Peripheral 10 concerned is lower that the reference value (predetermined value), resulting in an alleviation of the processing load. Alternatively, it is also applicable that the system is so constituted that the Multi-Functional Peripheral 10 sends the response indicating the possibility of sifting to the power saving mode back to the sender of the inquiry, which is received during the time when the Multi-Functional Peripheral 10 concerned already enters into the power saving mode or implements no job. In this case, the sender of the inquiry may determine whether or not the Multi-Functional Peripheral 10, which sent the response indicating the possibility of sifting to the power saving mode back to the sender of the inquiry, is currently in mid-course of the operating status.

Although the communications between the Multi-Functional Peripherals 10 included in the system are conducted through the PLC modem 8 in the preferred embodiment of the present invention, any other communication method (for instance, a wired LAN (Local Area Network) or a wireless LAN) is also applicable for this purpose.

According to the present invention, it becomes possible to appropriately select a specific image forming apparatus to be shifted to the power saving mode based on the implementation priority degree in order to avoid the power shutdown of the electric power consumption control system.

While the preferred embodiments of the present invention have been described using specific term, such description is for illustrative purpose only, and it is to be understood that changes and variations may be made without departing from the spirit and scope of the appended claims.

What is claimed is:

1. An image forming apparatus that is included in a plurality of image forming apparatuses, which are coupled to each other through a communication network in such a manner that the plurality of image forming apparatuses can bilaterally communicate with each other, the image forming apparatus comprising:
   an electric power consumption notifying section that calculates an own electric power consumption, representing an amount of electric power to be consumed by the image forming apparatus itself, so as to notify other image forming apparatuses of the own electric power consumption;
   a priority degree determining section to determine an implementation priority degree of a job, based on a kind of the job;
   a job implementation electric-power calculating section to calculate an estimated value of the own electric power consumption in regard to electric power to be consumed when the image forming apparatus implements an implementation scheduled job; and
   an arbitration controlling section that calculates a total electric power consumption to be consumed by the plurality of image forming apparatuses when the image forming apparatus implements the implementation scheduled job, based on electric power consumptions notified by the other image forming apparatuses and the estimated value of the own electric power consumption, so as to transmit an instruction for reducing electric power consumption to a specific image forming apparatus that currently implements a job whose implementation priority degree is lower than that of the implementation scheduled job, when the total electric power consumption calculated in the above exceeds an upper limit electric power consumption established in advance,
   wherein when receiving the instruction for reducing electric power consumption from another image forming apparatus, the image forming apparatus makes itself enter into a power saving mode, and then, transmits a power-saving mode shift completion notification to the other image forming apparatus serving as a sender of the instruction for reducing electric power consumption; and
   wherein when transmitting the instruction for reducing electric power consumption to another image forming apparatus preceding to implementing the implementation scheduled job, the image forming apparatus commences processing of the implementation scheduled job after receiving the power-saving mode shift completion notification from the other image forming apparatus serving as a receiver of the instruction.

2. The image forming apparatus of claim 1, further comprising:
   an instruction receiver determining section that transmits an inquiry attached with the implementation priority degree of the implementation scheduled job to the other image forming apparatuses in order to inquire a possibility or impossibility of reducing electric power consumption from each of them, when the total electric power consumption exceeds the upper limit electric power consumption, and selects the specific image forming apparatus from image forming apparatuses, which sent a response to the inquiry, indicating the possibility of reducing electric power consumption, back to the image forming apparatus, so as to determine the specific image forming apparatus as a receiver of the instruction for reducing electric power consumption; and
   a response transmitting section to transmit the response, indicating either possibility or impossibility of reducing electric power consumption, determined on the basis of a comparison result between the implementation priority degree attached to the inquiry and another implementation priority degree of a job being in mid-course of processing in the image forming apparatus, back to another image forming apparatus, being any one of the other image forming apparatuses, when the image forming apparatus receives the inquiry from the other image forming apparatus.

3. The image forming apparatus of claim 1, further comprising:
   an implementation priority degree exchanging section that notifies the other image forming apparatuses of an implementation priority degree of a job being in mid-course of processing in the image forming apparatus, and receives other implementation priority degrees of jobs being in mid-course of processing in the other image forming apparatuses, from the other image forming apparatuses, respectively; and
   an instruction receiver determining section that always recognizes the other implementation priority degrees received by the implementation priority degree exchanging section, and compares the implementation priority degree of the implementation scheduled job with those of the jobs being in mid-course of processing in the other image forming apparatuses, so as to determine the specific image forming apparatus as a receiver of the instruction for reducing electric power consumption.

4. The image forming apparatus of claim 1,
   wherein when transmitting the instruction for reducing electric power consumption to another image forming apparatus preceding to implementing the implementation scheduled job, the image forming apparatus transmits an implementation scheduled job completion notification to the other image forming apparatus after the implementation of the implementation scheduled job is completed.

5. The image forming apparatus of claim 1, further comprising:
   a stamping section to stamp a predetermined seal onto a recording paper sheet; and
   a storage section to store various kinds of information therein;
   wherein when receiving the instruction for reducing electric power consumption from another image forming apparatus, the image forming apparatus completes an operation for ejecting a recording paper sheet being in mid-course of conveying and makes the stamping section stamp the predetermined seal onto the recording paper sheet, and then, makes itself enter into a power saving mode after storing information for resuming a job, being in mid-course of processing at a time point when receiving the instruction, into the storage section; and wherein when resuming a previous operating mode from the power saving mode, the image forming apparatus resumes the job, based on the information stored in the storage section.

6. The image forming apparatus of claim 1, further comprising:

a display section to display various kinds of information;

wherein when receiving the instruction for reducing electric power consumption from another image forming apparatus during implementing a job, the image fowling apparatus suspends implementation of the job so as to make itself enter into a power saving mode, and makes the display section display a message, indicating that the image forming apparatus currently suspends implementation of the job concerned, thereon.

7. The image forming apparatus of claim 1, wherein a part of initializing operations, to be conducted after a main power source of the image forming apparatus is turned ON, is handled as an independent job, and the independent job is established as the implementation scheduled job.

8. The image forming apparatus of claim 1, wherein the priority degree determining section determines the implementation priority degree of the job, by taking at least one of a factor in regard to a user, another factor in regard to a processing capability of the image forming apparatus and still another factor in regard to a state of the image forming apparatus, into account, in addition to the kind of the job.

9. The image forming apparatus of claim 1, wherein the communication network is an electric power line network through which the plurality of image forming apparatuses bilaterally communicate with each other by employing PLC (Power Line Communication) modems, each of which is provided in each of the plurality of image forming apparatuses.

10. An electric power consumption control system, comprising:

a communication network; and a plurality of image forming apparatuses, which are coupled to each other through the communication network in such a manner that the plurality of image forming apparatuses can bilaterally communicate with each other;

wherein each of the plurality of image forming apparatuses comprises:

an electric power consumption notifying section that calculates an own electric power consumption, representing an amount of electric power to be consumed by an image forming apparatus concerned, so as to notify other image forming apparatuses of the own electric power consumption;

a priority degree determining section to determine an implementation priority degree of a job, based on a kind of the job;

a job implementation electric-power calculating section to calculate an estimated value of the own electric power consumption in regard to electric power to be consumed when the image forming apparatus concerned implements an implementation scheduled job; and an arbitration controlling section that calculates a total electric power consumption to be consumed by the plurality of image forming apparatuses when the image forming apparatus concerned implements the implementation scheduled job, based on electric power consumptions notified by the other image forming apparatuses and the estimated value of the own electric power consumption, so as to transmit an instruction for reducing electric power consumption to a specific image forming apparatus that currently implements a job whose implementation priority degree is lower than that of the implementation scheduled job, when the total electric power consumption calculated in the above exceeds an upper limit electric power consumption established in advance, wherein when receiving the instruction for reducing electric power consumption from another image forming apparatus, the image forming apparatus concerned makes itself enter into a power saving mode, and then, transmits a power-saving mode shift completion notification to the other image forming apparatus serving as a sender of the instruction for reducing electric power consumption; and wherein when transmitting the instruction for reducing electric power consumption to another image forming apparatus preceding to implementing the implementation scheduled job, the image forming apparatus concerned commences processing of the implementation scheduled job after receiving the power-saving mode shift completion notification from the other image forming apparatus serving as a receiver of the instruction.

11. The electric power consumption control system of claim 10, wherein each of the plurality of image forming apparatuses further comprises:

an instruction receiver determining section that transmits an inquiry attached with the implementation priority degree of the implementation scheduled job to the other image forming apparatuses in order to inquire a possibility or impossibility of reducing electric power consumption from each of them, when the total electric power consumption exceeds the upper limit electric power consumption, and selects the specific image forming apparatus from image forming apparatuses, which sent a response to the inquiry, indicating the possibility of reducing electric power consumption, back to the image forming apparatus concerned, so as to determine the specific image forming apparatus as a receiver of the instruction for reducing electric power consumption; and a response transmitting section to transmit the response, indicating either possibility or impossibility of reducing electric power consumption, determined on the basis of a comparison result between the implementation priority degree attached to the inquiry and another implementation priority degree of a job being in mid-course of processing in the image forming apparatus concerned, back to another image forming apparatus, being any one of the other image forming apparatuses, when the image forming apparatus receives the inquiry from the other image forming apparatus.

12. The electric power consumption control system of claim 10, wherein each of the plurality of image forming apparatuses further comprises:

an implementation priority degree exchanging section that notifies the other image forming apparatuses of an implementation priority degree of a job being in mid-course of processing in the image forming apparatus concerned, and receives other implementation priority degrees of jobs being in mid-course of processing in the other image forming apparatuses, from the other image forming apparatuses, respectively; and an instruction receiver determining section that always recognizes the other implementation priority degrees received by the implementation priority degree exchanging section, and compares the implementation priority degree of the implementation scheduled job with those of the jobs being in mid-course of processing in the other image forming apparatuses, so as to determine the specific image forming apparatus as a receiver of the instruction for reducing electric power consumption.

13. The electric power consumption control system of claim 10, wherein when transmitting the instruction for reducing electric power consumption to another image forming apparatus preceding to implementing the implementation scheduled job, the image forming apparatus concerned transmits an implementation scheduled job completion notification to the other image forming apparatus after the implementation of the implementation scheduled job is completed.

14. The electric power consumption control system of claim 10, wherein each of the plurality of image forming apparatuses further comprises:

a stamping section to stamp a predetermined seal onto a recording paper sheet; and a storage section to store various kinds of information therein; and wherein when receiving the instruction for reducing electric power consumption from another image forming apparatus, the image forming apparatus concerned completes an operation for ejecting a recording paper sheet being in mid-course of conveying and makes the stamping section stamp the predetermined seal onto the recording paper sheet, and then, makes itself enter into a power saving mode after storing information for resuming a job, being in mid-course of processing at a time point when receiving the instruction, into the storage section; and wherein when resuming a previous operating mode from the power saving mode, the image forming apparatus concerned resumes the job, based on the information stored in the storage section.

15. The electric power consumption control system of claim 10, wherein each of the plurality of image forming apparatuses further comprises:

a display section to display various kinds of information;

wherein when receiving the instruction for reducing electric power consumption from another image forming apparatus during implementing a job, the image forming apparatus concerned suspends implementation of the job so as to make itself enter into a power saving mode, and makes the display section display a message, indicating that the image forming apparatus currently suspends implementation of the job concerned, thereon.

16. The electric power consumption control system of claim 10, wherein a part of initializing operations, to be conducted after a main power source of the image forming apparatus concerned is turned ON, is handled as an independent job, and the independent job is established as the implementation scheduled job.

17. The electric power consumption control system of claim 10, wherein the priority degree determining section determines the implementation priority degree of the job, by taking at least one of a factor in regard to a user, another factor in regard to a processing capability of the image forming apparatus and still another factor in regard to a state of the image forming apparatus, into account, in addition to the kind of the job.

18. The electric power consumption control system of claim 10, wherein the communication network is an electric power line network through which the plurality of image forming apparatuses bilaterally communicate with each other by employing PLC (Power Line Communication) modems, each of which is provided in each of the plurality of image forming apparatuses.

* * * * *